(12) United States Patent
Mapen et al.

(10) Patent No.: US 10,366,296 B2
(45) Date of Patent: Jul. 30, 2019

(54) BIOMETRIC ENROLLMENT SYSTEMS AND METHODS

(71) Applicant: Princeton Identity, Inc., Hamilton, NJ (US)

(72) Inventors: Barry E. Mapen, Stonington, CT (US); David Alan Ackerman, Hopewell, NJ (US); James Russell Bergen, Hopewell, NJ (US); Steven N. Perna, Lawrenceville, NJ (US)

(73) Assignee: Princeton Identity, Inc., Hamilton, NJ (US)

( * ) Notice: Subject to any disclaimer, the term of this patent is extended or adjusted under 35 U.S.C. 154(b) by 0 days.

(21) Appl. No.: 15/475,425

(22) Filed: Mar. 31, 2017

(65) Prior Publication Data

US 2017/0286790 A1 Oct. 5, 2017

Related U.S. Application Data

(60) Provisional application No. 62/316,355, filed on Mar. 31, 2016.

(51) Int. Cl.
*G06K 9/00* (2006.01)

(52) U.S. Cl.
CPC ..... *G06K 9/00926* (2013.01); *G06K 9/00617* (2013.01); *G06K 9/00268* (2013.01)

(58) Field of Classification Search
CPC ........... G06K 9/00926; G06K 9/00604; G06K 9/00617; G06K 9/00221; G06K 9/00268; G06K 9/00281
See application file for complete search history.

(56) References Cited

U.S. PATENT DOCUMENTS 3,852,592 A 12/1974 Scoville et al.
3,993,888 A 11/1976 Fellman
(Continued)

FOREIGN PATENT DOCUMENTS

CN 102708357 A 10/2012
CN 103048848 A 4/2013
(Continued)

OTHER PUBLICATIONS

Ortiz et al. "An Optimal Strategy for Dilation Based Iris Image Enrollment." IEEE International Joint Conference on Biometrics, Sep. 29, 2014, 6 pages.*
(Continued)

*Primary Examiner* — Jon Chang
(74) *Attorney, Agent, or Firm* — McCarter & English, LLP

(57) ABSTRACT

Exemplary embodiments are directed to biometric enrollment systems including a camera and an image analysis module. The camera configured is to capture a probe image of a subject, the probe image including an iris of the subject. The image analysis module is configured to determine an iris characteristic of the iris in the probe image. The image analysis module is configured to analyze the probe image relative to a first enrollment image to determine if a match exists based on the iris characteristic. If the match exists, the image analysis module is configured to electronically store the matched probe image as an accepted image. The image analysis module is configured to select and establish the accepted image as a second enrollment image if the accepted image meets enrollment image criteria.

30 Claims, 12 Drawing Sheets

(56) References Cited

U.S. PATENT DOCUMENTS

| | | |
|---|---|---|
| 4,109,237 A | 8/1978 | Hill |
| 4,641,349 A | 2/1987 | Flom et al. |
| 5,291,560 A | 3/1994 | Daugman |
| 5,337,104 A | 8/1994 | Smith et al. |
| 5,481,622 A | 1/1996 | Gerhardt et al. |
| 5,572,596 A | 11/1996 | Wildes et al. |
| 5,835,616 A | 11/1998 | Lobo et al. |
| 5,861,940 A | 1/1999 | Robinson et al. |
| 5,933,515 A | 8/1999 | Pu et al. |
| 5,953,440 A | 9/1999 | Zhang et al. |
| 5,966,197 A | 10/1999 | Yee |
| 5,987,459 A | 11/1999 | Swanson et al. |
| 6,055,322 A | 4/2000 | Salganicoff et al. |
| 6,081,607 A | 6/2000 | Mori et al. |
| 6,119,096 A | 9/2000 | Mann et al. |
| 6,144,754 A | 11/2000 | Okano et al. |
| 6,204,858 B1 | 3/2001 | Gupta |
| 6,229,907 B1 | 5/2001 | Okano et al. |
| 6,247,813 B1 | 6/2001 | Kim et al. |
| 6,252,976 B1 | 6/2001 | Schildkraut et al. |
| 6,301,370 B1 | 10/2001 | Steffens et al. |
| 6,307,954 B1 | 10/2001 | Suzaki |
| 6,320,610 B1 | 11/2001 | Van Sant et al. |
| 6,421,462 B1 | 7/2002 | Christian et al. |
| 6,424,727 B1 | 7/2002 | Musgrave et al. |
| 6,433,326 B1 | 8/2002 | Levine et al. |
| 6,525,303 B1 | 2/2003 | Gladnick |
| 6,526,160 B1 | 2/2003 | Ito |
| 6,542,624 B1 | 4/2003 | Oda |
| 6,549,644 B1 | 4/2003 | Yamamoto |
| 6,614,919 B1 | 9/2003 | Suzaki et al. |
| 6,714,665 B1 | 3/2004 | Hanna et al. |
| 6,765,581 B2 | 7/2004 | Cheng |
| 6,836,554 B1 | 12/2004 | Bolle et al. |
| 6,850,252 B1 | 2/2005 | Hoffberg |
| 6,895,103 B2 | 5/2005 | Chen et al. |
| 6,912,298 B1 | 6/2005 | Wilensky |
| 6,977,989 B2 | 12/2005 | Bothe et al. |
| 7,015,955 B2 | 3/2006 | Funston et al. |
| 7,095,901 B2 | 8/2006 | Lee et al. |
| 7,099,495 B2 | 8/2006 | Kodno et al. |
| 7,118,042 B2 | 10/2006 | Moore et al. |
| 7,130,453 B2 | 10/2006 | Kondo et al. |
| 7,146,027 B2 | 12/2006 | Kim et al. |
| 7,295,686 B2 | 11/2007 | Wu |
| 7,310,443 B1 | 12/2007 | Kris et al. |
| 7,380,938 B2 | 6/2008 | Chmielewski, Jr. et al. |
| 7,428,320 B2 | 9/2008 | Northcott et al. |
| 7,466,308 B2 | 12/2008 | Dehlin |
| 7,466,847 B2 | 12/2008 | Komura |
| 7,542,628 B2 | 6/2009 | Lolacono et al. |
| 7,574,021 B2 | 8/2009 | Matey |
| 7,583,823 B2 | 9/2009 | Jones et al. |
| 7,599,524 B2 | 10/2009 | Camus et al. |
| 7,627,147 B2 | 12/2009 | Lolacono et al. |
| 7,634,114 B2 | 12/2009 | Zappia |
| 7,657,127 B2 | 2/2010 | Lolacono et al. |
| 7,751,598 B2 | 7/2010 | Matey et al. |
| 7,925,059 B2 | 4/2011 | Hoyos et al. |
| 8,050,463 B2 | 11/2011 | Hamza |
| 8,170,293 B2 | 5/2012 | Tosa et al. |
| 8,189,879 B2 | 5/2012 | Cambier |
| 8,195,576 B1 | 6/2012 | Grigg et al. |
| 8,200,980 B1 | 6/2012 | Robinson et al. |
| 8,317,325 B2 | 11/2012 | Raguin et al. |
| 8,337,104 B2 | 12/2012 | Takiguchi et al. |
| 8,374,404 B2 | 2/2013 | Williams et al. |
| 8,553,948 B2 | 10/2013 | Hanna |
| 8,603,165 B2 | 12/2013 | Park |
| 8,639,058 B2 | 1/2014 | Bergen et al. |
| 8,682,073 B2 | 3/2014 | Bergen |
| 8,755,607 B2 | 6/2014 | Bergen et al. |
| 8,854,446 B2 | 10/2014 | Bergen et al. |
| 8,934,005 B2 | 1/2015 | De Bruijn |
| 9,100,825 B2 | 8/2015 | Schultz et al. |
| 9,131,141 B2 | 9/2015 | Tinker et al. |
| 9,195,890 B2 | 11/2015 | Bergen |
| 9,514,365 B2 | 12/2016 | Tinker et al. |
| 9,665,772 B2 | 5/2017 | Bergen |
| 9,836,647 B2 | 12/2017 | Perna et al. |
| 9,836,648 B2 | 12/2017 | Perna et al. |
| 10,025,982 B2 | 7/2018 | Perna et al. |
| 2002/0080141 A1 | 6/2002 | Imai et al. |
| 2002/0118864 A1 | 8/2002 | Kondo et al. |
| 2002/0150280 A1 | 10/2002 | Li |
| 2002/0154794 A1 | 10/2002 | Cho |
| 2002/0164054 A1 | 11/2002 | McCartney et al. |
| 2002/0180586 A1 | 12/2002 | Kitson et al. |
| 2003/0046553 A1 | 3/2003 | Angelo |
| 2003/0103652 A1 | 6/2003 | Lee et al. |
| 2003/0123711 A1 | 7/2003 | Kim et al. |
| 2003/0169334 A1 | 9/2003 | Braithwaite et al. |
| 2003/0174211 A1 | 9/2003 | Imaoka et al. |
| 2004/0037452 A1 | 2/2004 | Shin |
| 2004/0088584 A1 | 5/2004 | Shachar et al. |
| 2004/0146187 A1 | 7/2004 | Jeng |
| 2004/0170304 A1 | 9/2004 | Haven |
| 2004/0213437 A1 | 10/2004 | Howard et al. |
| 2004/0236549 A1 | 11/2004 | Dalton |
| 2005/0047655 A1 | 3/2005 | Luo et al. |
| 2005/0063582 A1 | 3/2005 | Park et al. |
| 2005/0084179 A1 | 4/2005 | Hanna et al. |
| 2005/0088200 A1 | 4/2005 | Takekuma et al. |
| 2005/0210267 A1 | 9/2005 | Sugano et al. |
| 2005/0270386 A1 | 12/2005 | Saitoh et al. |
| 2006/0008125 A1 | 1/2006 | Lauper et al. |
| 2006/0028617 A1 | 2/2006 | Matsumura et al. |
| 2006/0098097 A1 | 5/2006 | Wach et al. |
| 2006/0105806 A1 | 5/2006 | Vance et al. |
| 2006/0120570 A1 | 6/2006 | Azuma et al. |
| 2006/0140454 A1 | 6/2006 | Northcott et al. |
| 2006/0150928 A1 | 7/2006 | Lehmann et al. |
| 2006/0184243 A1 | 8/2006 | Yilmaz |
| 2006/0202036 A1 | 9/2006 | Wang et al. |
| 2006/0210123 A1 | 9/2006 | Kondo et al. |
| 2006/0222212 A1 | 10/2006 | Du et al. |
| 2006/0245623 A1 | 11/2006 | Loiacono et al. |
| 2006/0274918 A1 | 12/2006 | Amantea et al. |
| 2007/0014439 A1 | 1/2007 | Ando |
| 2007/0025598 A1 | 2/2007 | Kobayashi et al. |
| 2007/0036397 A1 | 2/2007 | Hamza |
| 2007/0047770 A1 | 3/2007 | Swope et al. |
| 2007/0140531 A1 | 6/2007 | Hamza |
| 2007/0160266 A1 | 7/2007 | Jones et al. |
| 2007/0189582 A1 | 8/2007 | Hamza et al. |
| 2007/0198850 A1 | 8/2007 | Martin et al. |
| 2007/0201728 A1 | 8/2007 | Monro |
| 2007/0206935 A1 | 9/2007 | Ono |
| 2007/0236567 A1 | 10/2007 | Pillman et al. |
| 2007/0285537 A1 | 12/2007 | Dwinell et al. |
| 2008/0049185 A1 | 2/2008 | Huffman et al. |
| 2008/0069411 A1 | 3/2008 | Friedman et al. |
| 2008/0121721 A1 | 5/2008 | Chen et al. |
| 2008/0180544 A1 | 7/2008 | Drader et al. |
| 2008/0187174 A1 | 8/2008 | Metaxas et al. |
| 2008/0219515 A1 | 9/2008 | Namgoong |
| 2008/0271116 A1 | 10/2008 | Robinson et al. |
| 2009/0041309 A1 | 2/2009 | Kim |
| 2009/0208064 A1 | 8/2009 | Cambier |
| 2009/0216606 A1 | 8/2009 | Coffman et al. |
| 2009/0220126 A1 | 9/2009 | Claret-Tournier et al. |
| 2009/0232418 A1 | 9/2009 | Lolacono et al. |
| 2009/0278922 A1 | 11/2009 | Tinker et al. |
| 2010/0026853 A1 | 2/2010 | Mokhnatyuk |
| 2010/0034529 A1 | 2/2010 | Jelinek |
| 2010/0046808 A1 | 2/2010 | Connell et al. |
| 2010/0063880 A1 | 3/2010 | Atsmon et al. |
| 2010/0082398 A1 | 4/2010 | Davis et al. |
| 2010/0142938 A1 | 6/2010 | Zhang |
| 2010/0176802 A1 | 7/2010 | Huguet |
| 2010/0278394 A1 | 11/2010 | Raguin et al. |
| 2010/0287053 A1 | 11/2010 | Ganong et al. |
| 2010/0290668 A1 | 11/2010 | Friedman et al. |
| 2010/0301113 A1 | 12/2010 | Bohn et al. |

(56) References Cited

U.S. PATENT DOCUMENTS

| | | |
|---|---|---|
| 2010/0310133 A1 | 12/2010 | Mason et al. |
| 2010/0328420 A1 | 12/2010 | Roman |
| 2011/0007205 A1 | 1/2011 | Lee |
| 2011/0043683 A1 | 2/2011 | Beach et al. |
| 2011/0075893 A1 | 3/2011 | Connel, II et al. |
| 2011/0081946 A1 | 4/2011 | Singh |
| 2011/0134268 A1 | 6/2011 | MacDonald |
| 2011/0142297 A1 | 6/2011 | Yu et al. |
| 2011/0187878 A1 | 8/2011 | Mor et al. |
| 2011/0317991 A1 | 12/2011 | Tsai |
| 2012/0086645 A1 | 4/2012 | Zheng et al. |
| 2012/0154536 A1 | 6/2012 | Stoker et al. |
| 2012/0155716 A1 | 6/2012 | Kim |
| 2012/0163783 A1 | 6/2012 | Braithwaite et al. |
| 2012/0243729 A1 | 9/2012 | Pasquero |
| 2012/0293642 A1 | 11/2012 | Berini et al. |
| 2013/0014153 A1 | 1/2013 | Bhatia et al. |
| 2013/0044199 A1 | 2/2013 | Nanu et al. |
| 2013/0051631 A1 | 2/2013 | Hanna |
| 2013/0081119 A1 | 3/2013 | Sampas |
| 2013/0083185 A1 | 4/2013 | Coleman, III |
| 2013/0089240 A1 | 4/2013 | Northcott et al. |
| 2013/0091520 A1 | 4/2013 | Chen |
| 2013/0147603 A1 | 6/2013 | Malhas et al. |
| 2013/0150120 A1 | 6/2013 | Wu et al. |
| 2013/0162798 A1 | 6/2013 | Hanna et al. |
| 2013/0188943 A1 | 7/2013 | Wu |
| 2013/0194407 A1 | 8/2013 | Kim |
| 2013/0215228 A1 | 8/2013 | Stoker et al. |
| 2013/0250085 A1 | 9/2013 | MacKinnon |
| 2013/0329115 A1 | 12/2013 | Palmeri |
| 2014/0046772 A1 | 2/2014 | Raman |
| 2014/0055337 A1 | 2/2014 | Karlsson |
| 2014/0059607 A1 | 2/2014 | Upadhyay et al. |
| 2014/0071547 A1 | 3/2014 | O'Neill et al. |
| 2014/0078389 A1 | 3/2014 | Merz |
| 2014/0161325 A1 | 6/2014 | Bergen |
| 2014/0171150 A1 | 6/2014 | Hurst et al. |
| 2014/0232930 A1 | 8/2014 | Anderson |
| 2014/0327815 A1 | 11/2014 | Auger |
| 2014/0369575 A1 | 12/2014 | Riopka et al. |
| 2015/0037935 A1 | 2/2015 | Kim et al. |
| 2015/0098629 A1 | 4/2015 | Perna et al. |
| 2015/0098630 A1* | 4/2015 | Perna ................ G06K 9/00604 382/117 |
| 2015/0126245 A1 | 5/2015 | Barkan et al. |
| 2015/0193666 A1 | 7/2015 | Derakhshani et al. |
| 2015/0227790 A1 | 8/2015 | Smits |
| 2015/0286864 A1* | 10/2015 | Gottemukkula ..... G06K 9/0061 382/117 |
| 2015/0338915 A1 | 11/2015 | Publicover et al. |
| 2015/0379325 A1 | 12/2015 | Tinker et al. |
| 2016/0012275 A1 | 1/2016 | Bergen |
| 2016/0012292 A1 | 1/2016 | Perna et al. |
| 2016/0014121 A1 | 1/2016 | Perna et al. |
| 2016/0117544 A1 | 4/2016 | Hoyos et al. |
| 2016/0148384 A1 | 5/2016 | Bud et al. |
| 2016/0274660 A1 | 9/2016 | Publicover et al. |
| 2016/0345818 A1 | 12/2016 | Suzuki et al. |
| 2016/0364609 A1* | 12/2016 | Ivanisov ............ G06K 9/00604 |
| 2017/0111568 A1 | 4/2017 | Hsieh et al. |
| 2017/0124314 A1 | 5/2017 | Laumea |
| 2017/0132399 A1 | 5/2017 | Pawluk et al. |
| 2017/0199996 A1* | 7/2017 | Han ........................ G06F 21/32 |
| 2017/0286792 A1 | 10/2017 | Ackerman et al. |
| 2017/0323167 A1 | 11/2017 | Mapen et al. |
| 2017/0337439 A1 | 11/2017 | Ackerman et al. |
| 2017/0337440 A1 | 11/2017 | Green et al. |
| 2017/0337441 A1 | 11/2017 | Mapen et al. |
| 2017/0347000 A1 | 11/2017 | Perna et al. |
| 2018/0025244 A1 | 1/2018 | Bohl et al. |
| 2018/0165537 A1 | 6/2018 | Ackerman |

FOREIGN PATENT DOCUMENTS

| | | |
|---|---|---|
| CN | 103099624 A | 5/2013 |
| EP | 0821912 A2 | 2/1998 |
| EP | 1324259 A1 | 7/2003 |
| JP | 2007011667 A | 1/2007 |
| JP | 2008-538425 A | 10/2008 |
| JP | 4372321 B2 | 11/2009 |
| KR | 2003-0066512 A | 8/2003 |
| KR | 10-2011-0134848 A | 12/2011 |
| WO | WO-1996/19132 A1 | 6/1996 |
| WO | WO-1997/14873 A1 | 4/1997 |
| WO | WO-1997/21188 A1 | 6/1997 |
| WO | WO-1998/08439 A1 | 3/1998 |
| WO | WO-1999/31183 A1 | 6/1999 |
| WO | WO-2000/39760 A1 | 7/2000 |
| WO | WO-2013/056001 A1 | 4/2013 |
| WO | WO-2014/093227 A1 | 6/2014 |
| WO | WO-2014/100250 A2 | 6/2014 |
| WO | WO-2015/102704 A2 | 7/2015 |
| WO | WO-2017/172695 A1 | 10/2017 |
| WO | WO-2017/173228 A1 | 10/2017 |

OTHER PUBLICATIONS

Ortiz et al. "An Optimal Strategy for Dilation Based Iris Image Enrollment." IEEE International Joint Conference on Biometrics, Sep. 29, 2014, 6 pages (Year: 2014).*

Daugman, J., How Iris Recognition Works, IEEE Transactions on Circuits and Systems for Video Technology, 14, p. 21-30 (2002).

International Search Report and Written Opinion for Application No. PCT/US2017/025303 dated Jun. 16, 2017 (11 pages).

Annapoorani et al., Accurate and Fast Iris Segmentation. International Journal of Engineering Science and Technology. 2010;2(6):1492-1499.

Arfken, G., "Mathematical Methods for Physicists," Academic Press, NY 6.sup.th Ed. (2005).

Atos Origin, "UK Passport Service, Biometrics Enrollment Trial." Atos Origin Report (May 2005).

Bertalmio et al., Navier-Stokes, Fluid Dynamics, and Image and Video Inpainting. Proceedings of the 2001 IEEE Computer Society Conferenc on Computer Vision and Pattern Recognition. CVPR 2001, 8 pages, (2001).

Betke, et al., "Preliminary Investigation of Real-time Monitoring of a Driver in City Traffic," IEEE Intelligent Vehicles Syposium, Oct. 3-5, 2000, Dearborn, MI, 563-568.

Boehnen et al., A Multi-Sample Standoff Multimodal Biometric System, Theory, Aoolications and Systems (BTAS), Sep. 23, 2012, pp. 127-134.

Bowyer et al., Image Understanding for Iris Biometrics: A Survey. Computer Vision and Image Understanding. 2008;110:281-307.

Braithwaite, Michael et al., "Application-Specific Biometric Templates," AutoID 2002 Workshop, Tarrytown, NY, pp. 1-10 (2002).

Burt, et al., "The Laplacian Pyramid as a Compact Image Code," IEEE Transactions on Communications, 31(4): 532-540, 1983.

Canadian Offic Action for Application 2,833, 740 dated Jan. 15, 2018.

Office Action dated Oct. 30, 2018, issued in connection with U.S. Appl. No. 15/514,098 (35 pages).

Office Action dated Sep. 26, 2018, issued in connection with U.S. Appl. No. 15/471,131 (15 pages).

Daugman John, "How Iris Recognition Works," IEEE Transactions on Circuits and Systems for Video Teohnology, vol. 14, No. 1 (Jan. 2004).

Daugman, J., "High confidence visual recognition of persons by a test of statistical independence", IEEE Transactions on Pattern Analysis and Machine Intelligence, 15 (11), pp. 1148-1161 (1993).

Daugman, J., "Recognizing Persons by Their Iris Patterns," in Biometrics: Personal Indentification in a Networked Society, A.K. Jain, et al., eds. Kluwer Academic Pub. 1999.

Daugman, John et al., "Iris recognition border-crossing system in the UAE," International Airport Review, Issue 2 (2004).

(56) References Cited

OTHER PUBLICATIONS

Daugman, The Importance of Being Random: Statistical Principles of Iris Recognition. Pattern Recognition. Pre-publication version. 13 pages, Dec. 21, 2001.
DellaVecchia, et al., "Methodology and apparatus for using the human iris as a robust biometric," Ophthalmic Technologies VIII, SPIE Biomedical Optics Society, Photonics West Conference, San Jose, CA Jan. 24, 1998.
Du et al., Analysis of Partial Iris Recognition Using a 1-D Approach. Proceedings, IEEE International Conference on Acoustics, Speech, and Signal Processing. Mar. 18-23, 2005;2;961-964.
European Office Action for Application 12719332.4 dated Jan. 29, 2018.
European Search Report for Apllication 14876521.7 dated Oct. 19, 2017.
Extended European Search Report in connection with European Patent Application No. 15864635.6 dated Jun. 6, 2018 (8 pages).
Fan, et al., "An Efficient Automatic Iris Image Acquisition and Preprocessing System," Proceedings of the 2006 IEEE International Conference on Mechatronics and Automation, pp. 1779-1784 (6 pages).
Final Office Action dated Aug. 18, 2016 from U.S. Appl. No. 14/858,715, filed Sep. 18, 2015 (6 pages).
Final Office Action dated Aug. 4, 2016 from U.S. Appl. No. 14/509,366, filed Oct. 8, 2014 (24 pages).
Final Office Action dated Mar. 21, 2017 from U.S. Appl. No. 14/863,936, filed Sep. 24, 2015 (17 pages).
Final Office Action dated Mar. 22, 2017 from U.S. Appl. No. 14/863,950, filed Sep. 24, 2015 (16 pages).
Final Office Action dated Mar. 22, 2017 from U.S. Appl. No. 14/863,960, filed Sep. 24, 2015 (21 pages).
Final Office Action for U.S. Appl. No. 10/818,307, dated Jan. 21, 2009, 28 pages.
Final Office Action for U.S. Appl. No. 10/818,307, dated Jan. 30, 2008, 19 pages.
Final Office Action for U.S. Appl. No. 11/377,042, dated Nov. 14, 2008, 20 pages.
Final Office Action for U.S. Appl. No. 11/510,197, dated May 5, 2009, 16 pages.
Final Office Action for U.S. Appl. No. 12/464,369, dated Aug. 5, 2014, 22 pages.
Final Office Action for U.S. Appl. No. 12/464,369, dated Oct. 3, 2012, 27 pages.
Final Office Action for U.S. Appl. No. 12/576,644, dated Oct. 13, 2010, 11 pages.
Final Office Action for U.S. Appl. No. 14/100,615, dated Sep. 1, 2015, 22 pages.
Final Office Action for U.S. Appl. No. 14/509,356, dated Sep. 28, 2016, 20 pages.
Final Office Action for U.S. Appl. No. 14/509,366, dated Aug. 4, 2016, 29 pages.
Final Office Action for U.S. Appl. No. 14/846,090, dated Jun. 15, 2016, 17 pages.
Final Office Action for U.S. Appl. No. 14/858,715, dated Aug. 18, 2016, 29 pages.
Final Office Action for U.S. Appl. No. 14/858,715, dated Aug. 18, 2016, 6 pages.
Final Office Action for U.S. Appl. No. 14/863,936, dated Mar. 21, 2017, 17 pages.
Final Office Action for U.S. Appl. No. 14/863,950, dated Mar. 22, 2017, 16 pages.
Final Office Action for U.S. Appl. No. 14/863,960, dated Mar. 22, 2017, 21 pages.
First Japanese Office Action for Application 2015-545911 dated Feb. 26, 2018 ( with English translation).
FIT Validation Studies, http://www.pmifit.com/validation.htm, Mar. 2, 2004.
Google Scholar Search—"Rida Hadma" pp. 1 of 2.
Haro, et al., "Detecting and Tracking Eyes by Using Their Physiological Properties, Dynamics and Appearance," CVPR 2000, 163-168.
Hutchinson, et al., "Human-Computer Interaction Using Eye-Gaze Input," IEEE Transaction on Systems, Man and Cybernetics, 19(6): 1527-1534, 1989.
International Biometrics Group, "Independent Testing of Iris Recognition Technology, Final Report," Study Commissioned by the US Department of Homeland Security (May 2005).
International Preliminary Report on Patentability for Application No. PCT/US2015/051863, dated Mar. 28, 2017, 6 pages.
International Search Report and Written Opinion for Application No. PCT/US17/13110, dated May 18, 2017, 12 pages.
International Search Report and Written Opinion for Application No. PCT/US17/24444, dated Jun. 19, 2017, 9 pages.
International Search Report and Written Opinion for Application No. PCT/US2013/073887, dated Mar. 20, 2014, 11 pages.
International Search Report and Written Opinion for PCT/US2017/24444 dated Jun. 19, 2017 pp. 1-15.
International Search Report and Written Opinion for PCT/US2018/042807, dated Sep. 27, 2018, pp. 1-19.
International Search Report and Written Opinionf for PCT/US2017/025303 dated Jun. 16, 2017.
International Search Report for Application No. PCT/US2015/051863, dated Dec. 10, 2015, 1 page
International Search Report for Application No. PCT/US2017/065793, dated Feb. 16, 2018, 3 pages.
International Search Report for PCT/US2015061024, dated Mar. 31, 2016.
International Search Report of the International Searching Authority dated Jun. 28, 2018, issued in connection with International Application No. PCT/US2018/025895 (3 pages).
Iwai, Daisuke, Shoichiro Mihara, and Kosuke Sato. "Extended depth-of-field projector by fast focal sweep projection." IEEE transactions on visualization and computer graphics 21.4 (2015): 462-470.
Jacob, R., "The Use of Eye Movements in Human-Computer Interaction Techniques: What you Look at is What you Get," ACM Trans. Info.Sys., 9(3):152-169.
Japanese Office Action for Application No. 2015-545911, dated Feb. 20, 2018, 6 pages.
Li, Zexi, "An Iris Recognition Algorithm Based on Coarse and Fine Location," 2017 IEEE 2nd International Conference on Big Data Analysis, pp. 744-747 (4 pages).
Ma et al., "Efficient Iris Recognition by Characterizing Key Local Variations", IEEE Transactions on Image Processing, vol. 13, No. 6, Jun. 2004, 12 pages.
Ma., et al. "Iris Recognition Using Circular Symmetric Filters," Pattern Recognition, 2002, Proceedings 16th International Conference on vol. 2 IEEE, 2002 (4 pages).
Ma., et al., "Iris Recognition Based on Multichannel Gabor Filtering" ACCV2002: The 5th Asian Conference on Computer Vision, Jan. 23-25, 2002, Melbourne, Australia (5 pages).
Mansfield, Tony et al., "Biometric Product Testing Final Report," CESG Contract X92A/4009309, CESG/BWG Biometric Test Programme; Centre for Mathematics & Scientific Computing, National Physical Laboratory (2001).
Matey et al., Iris on the Move: Acquisition of Images for Iris Recognition in Less Constrained Environments. Proceedings of the IEEE. Nov. 2006;94(11):1936-1947.
Miyazawa et al., Iris Recognition Algorithm Based on Phase-Only Correlation, The Institute of Image Information and Television Engineers, Japan Jun. 27, 2006, vol. 30, No. 33, pp. 45-48.
Monro et al., An Effective Human Iris Code with Low Complexity. IEEE International Conference on Image Processing. Sep. 14, 2005;3:277-280.
Narayanswamy, et al., "Extended Depth-of-Field Iris Recognition System for a Workstation Environment," Proc. SPIE. vol. 5779 (2005) (10 pages).
Negin, et al., "An Iris Biometric System for Public and Personal Use," IEEE Computer, pp. 70- 75, Feb. 2000.
Nguyen, et al., "Quality-Driven Super-Resolution for Less Constrained Iris Recognition at a Distance and on the Move," IEEE Transactions on Information Forensics and Security 6.4 (2011) pp. 1248-1558 (11 pages).

(56) References Cited

OTHER PUBLICATIONS

Non-Final Office Action for U.S. Appl. No. 10/809,471, dated Mar. 19, 2007, 12 pages.
Non-Final Office Action for U.S. Appl. No. 10/818,307, dated Jul. 10, 2008, 28 pages.
Non-Final Office Action for U.S. Appl. No. 10/818,307, dated Mar. 20, 2007, 22 pages.
Non-Final Office Action for U.S. Appl. No. 11/334,968, dated Jan. 6, 2009, 28 pages.
Non-Final Office Action for U.S. Appl. No. 11/377,042, dated Apr. 8, 2009, 22 pages.
Non-Final Office Action for U.S. Appl. No. 11/377,042, dated Jan. 7, 2008, 13 pages.
Non-Final Office Action for U.S. Appl. No. 11/510,197, dated Oct. 10, 2008, 36 pages.
Non-Final Office Action for U.S. Appl. No. 11/510,197, dated Oct. 8, 2009, 21 pages.
Non-Final Office Action for U.S. Appl. No. 11/849,969, dated Dec. 19, 2008, 17 pages.
Non-Final Office Action for U.S. Appl. No. 11/857,432, dated Dec. 30, 2008, 23 pages.
Non-Final Office Action for U.S. Appl. No. 12/429,695, dated Sep. 2, 2009, 11 pages.
Non-Final Office Action for U.S. Appl. No. 12/464,369, dated Jan. 2, 2015, 23 pages.
Non-Final Office Action for U.S. Appl. No. 12/464,369, dated May 9, 2012, 33 pages.
Non-Final Office Action for U.S. Appl. No. US 12/576,644, dated Jul. 14, 2010, 14 pages.
Non-Final Office Action for U.S. Appl. No. 13/096,716, dated May 23, 2013, 16 pages.
Non-Final Office Action for U.S. Appl. No. 13/096,724, dated Jan. 16, 2014, 29 pages.
Non-Final Office Action for U.S. Appl. No. 13/096,728, dated May 7, 2013, 33 pages.
Non-Final Office Action for U.S. Appl. No. 13/096,728, dated Nov. 8, 2012, 37 pages.
Non-Final Office Action for U.S. Appl. No. 14/100,615, dated Mar. 4, 2015, 19 pages.
Non-Final Office Action for U.S. Appl. No. 14/509,356, dated Feb. 29, 2016, 19 pages.
Non-Final Office Action for U.S. Appl. No. 14/509,356, dated Mar. 16, 2017, 21 pages.
Non-Final Office Action for U.S. Appl. No. 14/509,366, dated Feb. 21, 2017, 25 pages.
Non-Final Office Action for U.S. Appl. No. 14/509,366, dated Mar. 3, 2016, 40 pages.
Non-Final Office Action for U.S. Appl. No. 14/846,090, dated Jan. 7, 2016, 35 pages.
Non-Final Office Action for U.S. Appl. No. 14/858,715, dated Mar. 14, 2016, 37 pages.
Non-Final Office Action for U.S. Appl. No. 14/863,936, dated Aug. 4, 2016, 16 pages.
Non-Final Office Action for U.S. Appl. No. 14/863,936, dated Sep. 26, 2017, 28 pages.
Non-Final Office Action for U.S. Appl. No. 14/863,950, dated Aug. 3, 2016, 15 pages.
Non-Final Office Action for U.S. Appl. No. 14/863,950, dated Sep. 26, 2017, 22 pages.
Non-Final Office Action for U.S. Appl. No. 14/863,960, dated Aug. 3, 2016, 21 pages.
Non-Final Office Action for U.S. Appl. No. 14/863,960, dated Sep. 28, 2017, 28 pages.
Non-Final Office Action for U.S. Appl. No. 15/531,922, dated Jun. 12, 2018, 17 pages.
Non-Final Office Action for for U.S. Appl. No. 12/464,369, dated Feb. 27, 2014, 25 pages.
Notice of Allowance dated Feb. 1, 2017 from U.S. Appl. No. 14/858,715, filed Sep. 18, 2015 (8 pages).
Notice of Allowance for U.S. Appl. No. 10/809,471, dated Mar. 24, 2008, 14 pages.
Notice of Allowance for U.S. Appl. No. 10/809,471, dated Oct. 5, 2007, 11 pages.
Notice of Allowance for U.S. Appl. No. 10/818,307, dated May 18, 2009, 8 pages.
Notice of Allowance for U.S. Appl. No. 11/334,968, dated Apr. 17, 2009, 11 pages.
Notice of Allowance for U.S. Appl. No. 11/377,042, dated Sep. 8, 2009, 16 pages.
Notice of Allowance for U.S. Appl. No. 11/510,197, dated Feb. 1, 2010, 13 pages.
Notice of Allowance for U.S. Appl. No. 11/849,969, dated Aug. 20, 2009, 21 pages.
Notice of Allowance for U.S. Appl. No. 11/849,969, dated Jul. 10, 2009, 18 pages.
Notice of Allowance for U.S. Appl. No. 11/857,432, dated Jun. 17, 2009, 17 pages.
Notice of Allowance for U.S. Appl. No. 12/429,695, dated Dec. 15, 2009, 7 pages.
Notice of Allowance for U.S. Appl. No. 12/429,695, dated Nov. 17, 2009, 12 pages.
Notice of Allowance for U.S. Appl. No. 12/464,369, dated May 8, 2015, 29 pages.
Notice of Allowance for U.S. Appl. No. 12/576,644, dated Dec. 10, 2010, 14 pages.
Notice of Allowance for U.S. Appl. No. 13/096,716, dated Oct. 30, 2013, 25 pages.
Notice of Allowance for U.S. Appl. No. 13/096,724, dated Aug. 19, 2014, 17 pages.
Notice of Allowance for U.S. Appl. No. 13/096,728, dated Feb. 7, 2014, 33 pages.
Notice of Allowance for U.S. Appl. No. 13/096,735, dated Jun. 24, 2013, 24 pages.
Notice of Allowance for U.S. Appl. No. 13/096,735, dated Oct. 4, 2013, 26 pages.
Notice of Allowance for U.S. Appl. No. 14/100,615, dated Sep. 28, 2015, 22 pages.
Notice of Allowance for U.S. Appl. No. 14/509,356, dated Aug. 1, 2017, 29 pages.
Notice of Allowance for U.S. Appl. No. 14/509,366, dated Jul. 31, 2017, 59 pages.
Notice of Allowance for U.S. Appl. No. 14/846,090, dated Jul. 25, 2016, 22 pages.
Notice of Allowance for U.S. Appl. No. 14/858,715, dated Feb. 1, 2017, 42 pages.
Notice of Allowance for U.S. Appl. No. 14/858,715, dated Feb. 1, 2017, 8 pages.
Notice of Allowance for U.S. Appl. No. 14/858,715, dated Mar. 1, 2017, 13 pages.
Notice of Allowance for U.S. Appl. No. 14/863,936, dated Mar. 20, 2018, 9 pages.
Notice of Allowance for U.S. Appl. No. 14/863,950, dated Mar. 27, 2018, 9 pages.
Notice of Allowance for U.S. Appl. No. 14/863,960, dated Mar. 20, 2018, 9 pages.
Office Action dated Aug. 3, 2016 from U.S. Appl. No. 14/863,950, filed Sep. 24, 2015 (15 pages).
Office Action dated Aug. 3, 2016 from U.S. Appl. No. 14/863,960, filed Sep. 24, 2015 (21 pages).
Office Action dated Aug. 4, 2016 from U.S. Appl. No. 14/863,936, filed Sep. 24, 2015 (16 pages).
Office Action dated Feb. 21, 2017 from U.S. Appl. No. 14/509,366, filed Oct. 8, 2014 (25 pages).
Office Action dated Mar. 14, 2016 from U.S. Appl. No. 14/858,715, filed Sep. 18, 2015 (9 pages).
Office Action dated Mar. 3, 2016 from U.S. Appl. No. 14/509,366, filed Oct. 8, 2014 (19 pages).
Restriction Requirement for U.S. Appl. No. 11/510,197, dated May 16, 2008, 12 pages.
Robert J.K. Jakob, "Eye Movement Based Human Computer Interaction Techniques; Toward Non-Command Interfaces," Advances in

(56) References Cited

OTHER PUBLICATIONS

Human-Computer Interaction, vol. 4, ed. By H.R. Hartson and D. Hix, pp. 151-190, Ablex Publishing Co., Norwood, N.J. (1993).
Robert J.K. Jakob, "Eye Tracking in Advanced Interface Design," in Virtual Environments and Advanced Interface Dseign, ed. by W. Barfield and T.A. Furness, pp. 258-288, Oxford University Press, New York (1995).
Roth, Mouthpiece Meditations, Part 3. Online Trombone Journal, www.trombone.org. 5 pages, Jul. 23, 2018.
Schovanec, Ocular Dynamics and Skeletal Systems, IEEE Control Systems Magazine. Aug. 2001;21(4):70-79.
Scoblete, The Future of the Electronic Shutter. pdn, Photo District News, retrieved online at: https://www.pdnonline.com/gear/cameras/the-future-of-the-electronic-shutter/, 6 pates, May 9, 2016.
Second Japanese Office Action for Application 2015-545911 dated Feb. 26, 2018 ( with English translation).
Singapore Search Report and Written Report for Application No. 11201704097X, dated Mar. 13, 2018, 5 pages.
SRI International, "Seeing the Future of Iris Recognition", available at www.sri.com/iom, Mar. 2014, 9 pages.
Swiniarski, Experiments on Human Recognition Using Error Backpropagation Artificial Neural Network. Neural Networks Class (CS553) of San Diego State University Computer Science Department, Apr. 2004.
Tan et al., Efficient Iris Recognition by Characterizing Key Local Variations. IEEE Transactions on Image Processing. Jun. 2004;13(6):739-750.
U.S. Appl. No. 14/100,615, "Iris Biometric Matching System", filed Dec. 9, 2013, 57 pages.
U.S. Appl. No. 14/100,615, "Iris Biometric Matching System," filed Dec. 9, 2013, 61 pages.
Provisional U.S. Appl. No. 61/888,130, filed Oct. 8, 2013, 20 pages.
Van der Wal, et al., "The Acadia Vision Processor," IEEE International Workshop on Computer Architecture for Machine Perception, pp. 31-40, Padova, Italy, Sep. 11-13, 2000.
Weisstein E. et al.; "Circle" From MathWorld—A Wolfram Web Resource. www.mathworld.wolfram.com/circle.html, pp. 1 to 8., Jul. 3, 2008.
Wildes, R., "Iris Recognition: An Emerging Biometric Technology," Proc. IEEE, 85(9):1348-1363, Sep. 1997.
Written Opinion for Application No. PCT/US2015/051863, dated Dec. 10, 2015, 5 pages.
Written Opinion for Application No. PCT/US2017/065793, dated Feb. 16, 2018, 10 pages.
Written Opinion for PCT/US2015061024, dated Mar. 21, 2016.
Written Opinion of the International Searching Authority dated Jun. 28, 2018, issued in connection with International Application No. PCT/US2018/025895 (10 pages).
www.m-w.com—definition—"ellipse" (Refer to Ellipse Illustration; also attached) pp. 1 of 2, 2008.
Yokoya, Ryunosuke, and Shree K. Nayar. "Extended depth of field catadioptric imaging using focal sweep." Proceedings of the IEEE International Conference on Computer Vision. 2015.
Zhu, et al., "Biometric Personal Identification Based on Iris Patterns," Pattern Recognition, Proceedings 15th International Conference on vol. 2 IEEE (2000) (4 pages).

* cited by examiner

BIOMETRIC ENROLLMENT SYSTEMS AND METHODS

CROSS-REFERENCE TO RELATED APPLICATIONS

The present application claims the benefit of priority to U.S. Provisional Patent Application No. 62/316,355, filed Mar. 31, 2016, which is hereby incorporated by reference in its entirety.

TECHNICAL FIELD

The present disclosure relates to biometric enrollment systems and methods and, in particular, to adaptive biometric enrollment systems that enroll and identify subjects across a wide range of operational conditions and over extended periods of time.

BACKGROUND

Security is a concern in a variety of transactions involving private information. As an example, iris recognition is a well-accepted and accurate means of biometric identification used in government and commercial systems around the world that enables secure transactions and an added layer of security beyond keys and/or passwords. Due to the increased security provided by iris recognition systems, an increase in use of such systems has occurred around the world.

Biometric identification systems generally compare a recently acquired sample (e.g., a probe) against a gallery of accepted reference samples called enrollments or enrollment images to determine the identity of the probe. A typical enrollment process involves collecting a single sample or selecting a single sample from a plurality of samples acquired during an enrollment session with the subject. When both the enrollment and probe samples are acquired under similar conditions, the samples are expected to exhibit high similarities resulting in confident matches. When the conditions of the collection environment for probes are substantially different than the conditions for enrollment, certain changes may cause the two samples to appear less similar resulting in less confident matches, if a match can be declared at all. As one example, changes in the environment conditions can affect biological characteristics in the collected samples. As another example, changes in the environment conditions can affect non-biological characteristics in the collected samples, such as shadows on the face of a subject caused by surrounding objects or features of the face itself (e.g., shadows from eyelashes due to the position of the sun). This is especially true for mobile applications where users expect anytime and anywhere functionality.

Iris identification or authentication systems generally rely on a single enrollment image as the basis of comparison. For example, such authentication systems generally include an enrollment image for each subject and authenticate the subject by determining which of the multiple enrollment images matches the probe sample. Some authentication systems can include a single enrollment image for each eye of the subject, with authentication occurring by matching one or both eyes of the subject to the enrollment images. The enrollment image of each eye is taken in specific environmental (e.g., lighting) conditions. When users are authenticated in environmental conditions different from the enrollment conditions, their iris may be at a different dilation.

Some traditional biometric processing systems attempt to address biological changes between independent sample collections. For example, some iris processing techniques attempt to compensate for differences such as pupil dilation variation that results when different lighting conditions exist between the enrollment and probe sample acquisitions. (See, e.g., Daugman, J., How Iris Recognition Works, *IEEE Transactions on Circuits and Systems for Video Technology,* 14, p. 21-30 (2002)). This is generally accomplished by normalizing the texture before matching the subject. The normalization technique assumes that the texture moves linearly as the pupil dilates or constricts. While this method works well over a range of dilations, the scores still suffer as the difference in enrollment and probe sample dilations increases due to more complex movements of the iris. The result is an increase in falsely rejecting authentic subjects.

Some systems attempt to control the lighting conditions that limit their ability to work in any environment. Such systems may work in building access control, but mobile applications generally involve environments not easily controlled. Limiting the installation of systems to instances where the environment can be adequately controlled is not practical for mass deployment. An alternate approach is to build the system to provide a temporary control over the environment. Systems similar to the Secure Electronic Enrollment Kit (SEEK) system attempt to control the light levels influencing pupil dilation by having users insert their face into a shaded cover to block ambient light. This is only a partial solution however, since a subject's body may take a period of time to adjust or acclimate to the temporary environment. For example, a subject who has been in direct sunlight may need to wait seconds before their pupils dilate to a normal enrollment size. Failure to wait long enough can result in failure to be identified by the system. In addition, waiting with one's head in a shaded box for a period of time is inconvenient to the user and limits the maximum number of subjects that can be identified in the equivalent period of time.

Another approach has been to enroll a subject multiple times in each possible environment. This can be problematic because it is often impractical to create all of the possible conditions in a single, convenient setting for an enrolling subject. For example, there is significant complexity in creating a pitch black room, a bright sunny day, and a normal office environment using only a mobile phone. Adding additional enrollments can also create system performance problems. The storage requirements for the enrollment gallery increases by a factor equal to the number of samples permitted per subject. Increasing the size of the enrollment gallery increases the number of statistical trials attempted against every probe that is submitted, which increases the likelihood of falsely accepting an imposter. Increasing the gallery size also increases the time it takes the system to perform an exhaustive set of comparisons, resulting in reduced system responsiveness.

Even if all of the possible environmental combinations are created, the effect of aging is challenging to predict. Everything ages over sufficient time and will start to appear different from an historical enrollment. Over time, certain characteristics of a subject undergo short-term and long-term changes. Pupil dilation is only one example of a short-term adaptation in response to a changing environment that can impact a biometric identification system. Fingerprints swell and contract in response to moisture and water retention. Faces change rapidly with subjects squinting in sunlight, laughing, turning their head, and the like. Over longer periods of time, biometrics suffer from aging, such as wrinkles, sagging, changes in pose, changes in expression, and the like. Due to the aging process, subjects continue to adapt away from a single historical enrollment. As differences become more pronounced, an increased difficulty of being identified by a biometric identification system may occur. If the differences are great enough, a subject must reenroll before being able to continue using the system.

Thus, a need exists for an improved method of enrolling and identifying subjects across a wide range of environmental conditions and over extended periods of time in an efficient and cost-effective manner. These and other needs are addressed by the biometric enrollment systems and methods of the present disclosure.

SUMMARY

In accordance with embodiments of the present disclosure, an exemplary biometric enrollment system is provided that includes a camera configured to capture a first image of a subject. The first image includes at least one iris of the subject. The biometric enrollment system includes an image analysis module configured to determine a normalized iris texture ratio (NITR) of the iris of the subject from the first image. The image analysis module is configured to establish the first image of the iris as a first enrollment image. The image analysis module is configured to electronically store the first enrollment image in a first bin of a predetermined number of bins. The normalized iris texture ratio of the iris in the first enrollment image corresponds to a range of the normalized iris texture ratio of the first bin.

The camera is configured to capture one or more probe images of the subject after establishment and storage of the first enrollment image (e.g., during verification of the subject using a biometric analysis system). The probe images include the iris of the subject. The image analysis module is configured to determine the normalized iris texture ratio of the iris in each of the probe images. The image analysis module is configured to analyze the probe images relative to the first enrollment image to determine if a match exists (e.g., a verification step). If the match exists, the image analysis module is configured to electronically store the matched probe images as accepted images in a second bin of the predetermined number of bins (and, if a match exists, there can be an authentication, e.g., to allow physical access to a place or thing or logical access from a computer to data).

It should be understood that the verification step between the enrollment image and probe image can be only one verification step by the biometric system, and one or more additional verification/authentication steps can be used. For example, the determination of a match between the enrollment image and probe image can be used to indicate that the verification is permissible and one or more additional verification/authentication steps can be used to complete verification of the subject. Similarly, a non-match between the enrollment image and the problem image can be used to indicate that the verification is impermissible and the one or more additional verification/authentication steps should not be used until a match is found with a subsequent probe image.

The normalized iris texture ratio of the iris in the accepted images corresponds to the range of the normalized iris texture ratio of the second bin. The image analysis module is configured to select and establish one accepted image (of, e.g., a plurality of accepted images) from the second bin as a second enrollment image of the second bin in accordance with iris biometric standards. Thus, if a probe image is within the coverage area of the first enrollment image it is an accepted image allowing authentication, and, further, if this probe image meets specific iris biometric standards and is in an adjacent bin, it can be selected as a second enrollment image, which corresponds to that adjacent bin.

The first enrollment image in the first bin and the second enrollment image in the second bin provide enrollment images in different ranges of the normalized iris texture ratio such that the subject can be authenticated in varying environmental conditions that affect the normalized iris texture ratio of the subject's iris.

In some embodiments, the subject (e.g., at least the iris of the subject) can be illuminated by ambient lighting in the environment in which the capture of the images occurs. In some embodiments, the biometric enrollment system includes one or more illumination sources (e.g., one or more light-emitting diodes (LEDs), or the like) configured to illuminate the iris of the subject. The first enrollment image includes a coverage area extending across the first bin and at least a portion of the second bin. The coverage area can be defined by a radius with the first enrollment image as a center of the coverage area. The first and second bins are disposed adjacent to each other. The second enrollment image includes a coverage area extending across the second bin and at least a portion of the first bin. In some embodiments, the coverage area for the first and second enrollment images can overlap. The coverage area of the second enrollment image extends across at least a portion of a third bin disposed adjacent to the second bin.

In some embodiments, the image analysis image can be configured to select the accepted image as the second enrollment image based on a highest acceptance matching value as compared to other accepted images in the second bin, e.g., in accordance with iris biometric standards. If the match does not exist between the probe image and the first enrollment image, the image analysis module can be configured to electronically store the probe image as a rejected image in a database. The first enrollment image, the accepted images, and the second enrollment image can be electronically stored in a database.

In accordance with embodiments of the present disclosure, an exemplary method of biometric system enrollment is provided. The method includes capturing a first image of a subject with a camera of a biometric enrollment system. The first image includes at least one iris of the subject. The method includes determining a normalized iris texture ratio of the iris of the subject from the first image with an image analysis module. The method includes establishing the first image of the iris as a first enrollment image (e.g., with the image analysis module). The method includes electronically storing the first enrollment image in a first bin of a predetermined number of bins (e.g., with the image analysis module). The normalized iris texture ratio of the iris in the first enrollment image corresponds to a range of the normalized iris texture ratio of the first bin.

The method includes capturing one or more probe images of the subject with the camera after establishment and storage of the first enrollment image. The probe images includes the iris of the subject. The method includes determining the normalized iris texture ratio of the iris in each of the probe images with the image analysis module. The method includes analyzing the probe images relative to the first enrollment image to determine if a match exists (e.g., with the image analysis module). If the match exists, the method includes electronically storing the matched probe images as accepted images in a second bin of the predetermined number of bins (e.g., with the image analysis module). The normalized iris texture ratio of the iris in the accepted images corresponds to the range of the normalized iris texture ratio of the second bin. The method includes selecting and establishing one accepted image from the second bin as a second enrollment image of the second bin (e.g., with the image analysis module). The first enrollment image in the first bin and the second enrollment image in the second bin provide enrollment images in different ranges of the normalized iris texture ratio, thereby allowing for authentication of the subject in different environmental conditions.

In some embodiments, the method includes illuminating the subject (e.g., the iris of the subject) with ambient light. In some embodiments, the method includes illuminating the iris of the subject with one or more illumination sources (e.g., LEDs). In some embodiments, selecting the accepted image as the second enrollment image can include selecting the accepted image based on a highest acceptance matching value as compared to other accepted images in the second bin. If the match does not exist between the first enrollment image and the probe image, the method includes electronically storing the probe image as a rejected image in a database. The method includes electronically storing the first enrollment image, the accepted images, and the second enrollment image in a database.

The first enrollment image includes a coverage area extending across the first bin and at least a portion of the second bin. The first and second bins are disposed adjacent to each other. The second enrollment image includes a coverage area extending across the second bin and at least a portion of the first bin. The coverage area of the second enrollment image extends across at least a portion of a third bin disposed adjacent to the second bin.

In accordance with embodiments of the present disclosure, an exemplary non-transitory computer-readable medium storing instructions for biometric system enrollment is provided. The instructions are executable by a processing device. Execution of the instructions by the processing device causes the processing device to capture a first image of a subject with a camera of a biometric enrollment system. The first image includes at least one iris of the subject. Execution of the instructions by the processing device causes the processing device to determine a normalized iris texture ratio of the iris of the subject from the first image with an image analysis module. Execution of the instructions by the processing device causes the processing device to establish the first image of the iris as a first enrollment image. Execution of the instructions by the processing device causes the processing device to electronically store the first enrollment image in a first bin of a predetermined number of bins. The normalized iris texture ratio of the iris in the first enrollment image corresponds to a range of the normalized iris texture ratio of the first bin.

Execution of the instructions by the processing device causes the processing device to capture one or more probe images of the subject with the camera after establishment and storage of the first enrollment image. The probe images include the iris of the subject. Execution of the instructions by the processing device causes the processing device to determine the normalized iris texture ratio of the iris in each of the probe images with the image analysis module. Execution of the instructions by the processing device causes the processing device to analyze the probe images relative to the first enrollment image to determine if a match exists. If the match exists, execution of the instructions by the processing device causes the processing device to electronically store the matched probe images as accepted images in a second bin of the predetermined number of bins. The normalized iris texture ratio of the iris in the accepted images corresponds to the range of the normalized iris texture ratio of the second bin. Execution of the instructions by the processing device causes the processing device to select and establish one accepted image from the second bin as a second enrollment image of the second bin. The first enrollment image in the first bin and the second enrollment image in the second bin provide enrollment images in different ranges of the normalized iris texture ratio.

In accordance with embodiments of the present disclosure, an exemplary biometric enrollment system is provided that includes a camera and an image analysis module. The camera can be configured to capture a probe image of a subject, the probe image including an iris of the subject. The image analysis module can be configured to determine an iris characteristic of the iris in the probe image. The image analysis module can be configured to analyze the probe image relative to a first enrollment image to determine if a match exists based on the iris characteristic. If the match exists, the image analysis module can be configured to electronically store the matched probe image as an accepted image. The image analysis module can be configured to select and establish the accepted image as a second enrollment image if the accepted image meets enrollment image criteria.

In some embodiments, the iris characteristic can be a normalized iris texture ratio (NITR) of the iris. In some embodiments, the enrollment image criteria can include whether the iris characteristic of the iris in the probe image is within a coverage area of the first enrollment image. The coverage area of the first enrollment image can define a variation in the iris characteristic of the iris acceptable for a match with the first enrollment image. In some embodiments, the enrollment image criteria can include whether the iris characteristic of the iris in the probe image meets an iris biometric standard. For example, the iris biometric standard can be at least one of International Organization of Standardization (ISO) 19794 or ISO 29794, which are incorporated herein by reference.

The first enrollment image can be electronically stored in a first bin of a predetermined number of bins, an iris characteristic of the iris in the first enrollment image corresponding to a range of the iris characteristic of the first bin. The image analysis module can be configured to electronically store the accepted image in a second bin of the predetermined number of bins, the iris characteristic of the iris in the accepted image corresponding to a range of the iris characteristic of the second bin. The first enrollment image in the first bin and the second enrollment image in the second bin can provide enrollment images in different ranges of the iris characteristic.

The biometric enrollment system can include one or more illumination sources configured to illuminate the iris of the subject. In some embodiments, the second enrollment image can include a coverage area partially overlapping a coverage area of the first enrollment image. If the match does not exist, the image analysis module can be configured to electronically store the probe image as a rejected image in a database. The first enrollment image, the accepted image, and the second enrollment image can be electronically stored in a database.

In accordance with embodiments of the present disclosure, an exemplary method of biometric system enrollment is provided. The method includes capturing a probe image of a subject with a camera, the probe image including an iris of the subject. The method includes determining an iris characteristic of the iris in the probe image with an image analysis module. The method includes analyzing the probe image relative to a first enrollment image to determine if a match exists based on the iris characteristic. If the match exists, the method includes electronically storing the matched probe image as an accepted image. The method includes determining if the accepted image meets enrollment image criteria. If the accepted image meets the enrollment image criteria, the method includes selecting and establishing the accepted image as a second enrollment image.

The method can include illuminating the iris of the subject with one or more illumination sources. In some embodiments, determining if the accepted image meets the enrollment image criteria can include determining whether the iris characteristic of the iris in the probe image is within a coverage area of the first enrollment image. The coverage area of the first enrollment image can define a variation in the iris characteristic of the iris acceptable for a match with the first enrollment image. In some embodiments, determining if the accepted image meets the enrollment image criteria can include determining whether the iris characteristic of the iris in the probe image meets an iris biometric standard. For example, the iris biometric standard can be at least one of International Organization of Standardization (ISO) 19794 or ISO 29794. If the match does not exist, the method can include electronically storing the probe image as a rejected image in a database. The method can include electronically storing the first enrollment image, the accepted image, and the second enrollment image in a database.

In accordance with embodiments of the present disclosure, an exemplary non-transitory computer-readable medium storing instructions for biometric system enrollment is provided. The instructions are executable by a processing device. Execution of the instructions by the processing device causes the processing device to capture a probe image of a subject with a camera, the probe image including an iris of the subject. Execution of the instructions by the processing device causes the processing device to determine an iris characteristic of the iris in the probe image with an image analysis module. Execution of the instructions by the processing device causes the processing device to analyze the probe image relative to a first enrollment image to determine if a match exists based on the iris characteristic. If the match exists, execution of the instructions by the processing device causes the processing device to electronically store the matched probe image as an accepted image. Execution of the instructions by the processing device causes the processing device to determine if the accepted image meets enrollment image criteria. If the accepted image meets the enrollment image criteria, execution of the instructions by the processing device causes the processing device to select and establish the accepted image as a second enrollment image.

In accordance with embodiments of the present disclosure, an exemplary biometric enrollment system is provided that includes a camera and an image analysis module. The camera can be configured to capture a probe image of a subject. The image analysis module can be configured to determine a subject characteristic of the in the probe image. The image analysis module can be configured to analyze the probe image relative to a first enrollment image to determine if a match exists based on the subject characteristic. If the match exists, the image analysis module can be configured to electronically store the matched probe image as an accepted image. The image analysis module can be configured to select and establish the accepted image as a second enrollment image if the accepted image meets enrollment image criteria.

In some embodiments, the subject characteristic can be a normalized iris texture ratio (NITR) of an iris of the subject. In some embodiments, the enrollment image criteria can include whether the subject characteristic in the probe image is within a coverage area of the first enrollment image. The coverage area of the first enrollment image can define a variation in the subject characteristic acceptable for a match with the first enrollment image. In some embodiments, the enrollment image criteria can include whether the subject characteristic in the probe image meets a biometric standard. For example, the biometric standard can be at least one of International Organization of Standardization (ISO) 19794 or ISO 29794. In some embodiments, the subject characteristic can be a facial characteristic of the subject. In some embodiments, the facial characteristic of the subject can be at least one of a muscle landmark or a bone landmark of the subject.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed biometric enrollment systems and methods, reference is made to the accompanying figures, wherein.

DESCRIPTION OF EXEMPLARY EMBODIMENTS

Figure 1:
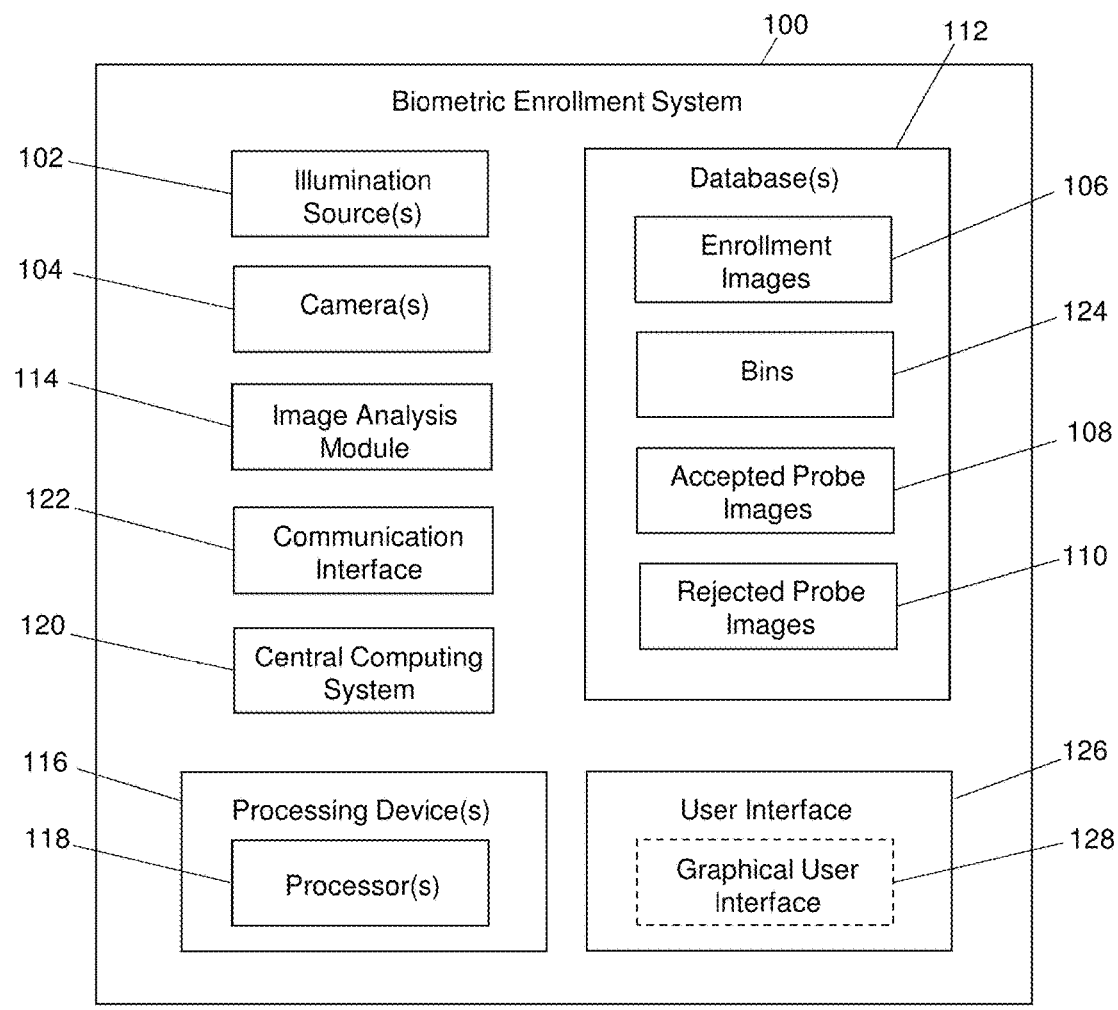
FIG. 1 is a block diagram of an exemplary biometric enrollment system in accordance with the present disclosure.

In accordance with embodiments of the present disclosure, exemplary biometric identification systems are described herein that include adaptive matching and enrollment features for simplifying the enrollment process and providing greater ease of use for subjects over time. Biometric identification systems generally include an acquisition subsystem, processing subsystem, and user interface subsystem. The acquisition subsystem is generally used to acquire biometric samples. The term "sample" as used herein can include still frame images, video, thermal images, pressure images, ultrasonic images, radio frequency images, audio recordings, combinations thereof, or the like.

The processing subsystem is generally used to extract features from the samples in the form of templates, allow an authority of the system to enroll one or more templates, and match newly acquired probe templates against previously enrolled templates. The term "template" as used herein can include the raw samples, N-dimensional phase information, amplitude information, ridge patterns, landmarks, combinations thereof, or the like. The user interface subsystem is generally used to facilitate the subject's interaction with the system. The adaptive matching and enrollment (AME) element can be added as a unique module to the system or can be combined with existing modules of the system, such as the processing subsystem. Information/data from other elements of the system can be transmitted to and from the AME.

Generally, adding a subject's biometric templates to an enrollment gallery is a relatively complex process that may use a combination of biometric and non-biometric methods to initially verify the subject's true identity. The process of enrolling a subject typically includes capturing one or more biometric samples, converting them to templates, and storing them in the enrollment gallery. On future encounters, probe samples can be automatically compared against the enrollment gallery to determine the identity of the presenting subject or declare that the subject appears to be an unauthorized user or imposter to the system. If a subject is frequently declared an imposter, the subject may benefit from reenrolling. Enrolling or reenrolling a subject can occur at any time.

Biometric matching generally relies on statistical comparisons of a probe template against an enrollment gallery. When using similarity scores, the more similar two templates are the higher the confidence in the presenting subject's identity. Generally, a threshold is set to provide a decision between the system declaring a match or no-match. This generally translates to an operational performance point between the types of errors the system can make. One method of describing the performance curve across all thresholds is with a detector error tradeoff (DET) curve. The DET curve describes the tradeoff between the system's false reject rate (FRR) where an authentic subject fails to be identified, and the system's false accept rate (FAR) where an imposter is incorrectly identified as an enrolled subject.

The AME can electronically store any information generated during an encounter with an identified or unidentified subject for future reference. When a subject is successfully identified, the AME can adapt the existing enrollment for that subject using any current or prior information. The term "adapt" as used herein can include altering, modifying, combining, replacing, combinations thereof, or the like. The result of adapting the enrollment of a subject is improved ease of use. The AME can use different adaptation techniques for different types of improvements. For example, the AME can add templates to expand the range of environments where the subject can be identified, and can replace templates to compensate for aging. Further, instead of being limited to using a single threshold, an AME can opt to use different thresholds based on the age of the enrollment templates, environmental conditions of the samples in the enrollment gallery, current environmental conditions, historical data acquired, combinations thereof, and the like.

With reference to FIG. 1, a block diagram of an exemplary adaptive matching and biometric enrollment system 100 (hereinafter "system 100") is provided. The system 100 generally includes an iris acquisition subsystem, an iris processing subsystem, a user interface subsystem, and an adaptive matching and enrollment (AME) module. The system 100 can include one or more illumination sources 102 configured to illuminate at least a portion of an iris of a subject. In some embodiments, the illumination sources 102 can be ambient light in the environment surrounding the subject during use of the system 100. In some embodiments, the illumination sources 102 can be LEDs (e.g., LEDs associated with the device implementing the system 100, near infrared light, and the like). The system 100 includes one or more cameras 104 configured to capture images of the subject that include at least one iris of the subject. The illumination sources 102 and the cameras 104 can be part of the iris acquisition subsystem.

As will be discussed in greater detail below, the images captured by the cameras 104 can be stored as enrollment images 106, accepted probe images 108, and/or rejected probe images 110 in one or more databases 112 of the system 100. Although shown as a single system 100, it should be understood that in some embodiments, the first or initial enrollment image 106 can be captured by an enrollment station (e.g., a first set of equipment), with the first or initial enrollment image 106 being transmitted to the database 112, and subsequent probe images 108, 110 and enrollment images 106 can being captured by physically different sets of equipment. Thus, the initial enrollment image equipment need not be the same equipment with which subsequent probe and/or enrollment images are captured.

The system 100 includes an image analysis module 114 that can be executed by a processing device 116 including a processor 118. In some embodiments, the image analysis module 114 and/or the processing device 116 can be part of a central computing system 120. The image analysis module 114, the processing device 116, and the central computing system 120 can be part of the iris processing subsystem and/or the AME module. The image analysis module 114 can segment the images captured by the camera 104 to determine anatomical boundaries of features within the images, extract the iris texture, and convert the texture to a template. The image analysis module 114 can use any of this extracted or detected information to compare a newly acquired template to a previously acquired enrollment image gallery (e.g., enrollment images 106). The image analysis module 114 can determine if an enrollment adaptation is warranted. The image analysis module 114 can store any data collected by the acquisition subsystem for comparison with past or future samples before making an adaptive enrollment change.

Initially, the camera 104 can be actuated (e.g., with the processing device 116) to capture a first image of the subject. The first image can be electronically transmitted from the camera 104 to the image analysis module 114 by a communication interface 122. The image analysis module 114 analyzes the first image and determines the normalized iris texture ratio (NITR) of the iris of the subject from the first image (e.g., one type of iris characteristic). The NITR can range from 0% to 100%, defines the level of dilation or constriction of the pupil, and can be determined based on Equation 1:

$$NITR = \left[1 - \frac{\text{Pupil Diameter}}{\text{Iris Diameter}}\right] \times 100 \qquad (1)$$

The boundaries determined during processing of the captured image can include the pupil-iris boundary and the iris-sclera boundary. The dilation of the pupil can be normalized using these boundaries to define the Pupil-to-Iris Ratio (PIR). Regarding NITR, a person of ordinary skill in the art will recognize that PIR=1−NITR. NITR is a concept that is discussed herein; however, given this known relationship between NITR and PIR, a person of ordinary skill in the art will appreciate that said discussions also apply to PIR.

The image analysis module 114 can establish the first image of the iris as a first enrollment image (e.g., storing the first image as one of the enrollment images 106), thereby enrolling the subject in the biometric identification system associated with the system 100. The image analysis module 114 can further electronically store the first enrollment image in one bin of a predetermined number of bins 124. Each bin 124 can be associated with a predetermined range of NITRs. For example, the system 100 can include five bins 124, with a first bin corresponding to an NITR of 0-19%, a second bin corresponding to an NITR of 20-39%, a third bin corresponding to an NITR of 40-59%, a fourth bin corresponding to an NITR of 60-79%, and a fifth bin corresponding to an NITR of 80-100%. However, it should be understood that any number of bins 124 can be used (e.g., one or more bins). For example, a single bin 124 can be used and enrollment adaptation can be limited to selecting a better enrollment image over time and adapting to aging effects or environmental changes, if any. Two or more bins 124 allow for additional adaptation over different pupil dilations. In some embodiments, the bins 124 can be of the same size (e.g., the same range of NITR). In some embodiments, the bins 124 can be of different sizes (e.g., different ranges of NITR). The NITR of the first enrollment image 106 can correspond to the range of the NITR of the bin 124 with which it is associated. For example, if the first enrollment image 106 has an NITR of 43%, the first enrollment image 106 can be associated with the third bin 124.

In addition to providing for authentication in the bin 124 corresponding to the NITR of the first enrollment image 106, the first enrollment image 106 can have a coverage area (e.g., a radius) that extends across at least a portion of its own bin 124 and one or more of the surrounding bins 124. The coverage area represents the acceptable variation in subject characteristics (e.g., pupil dilation) from the first enrollment image 106) in which the probe image can still match with the first enrollment image 106. For example, if the first enrollment image 106 is stored in the third bin 124, the coverage area can extend across the majority of the third bin 124 and at least a portion of the second and fourth bins 124. In some embodiments, the coverage area can extend across the majority of the third bin 124, as well as the fourth and fifth bins 124. Thus, the first enrollment image 106 can be used to successfully authenticate the subject when the captured probe images have an iris with an NITR that falls into ranges that are not in the same bin 124 as the first enrollment image 106 (e.g., immediately adjacent or surrounding bins 124). In particular, the first enrollment image 106 can be used to authenticate the subject in environmental conditions that are not exactly the same as those of the first enrollment image 106.

The first enrollment image is typically prepared to instantiate the system, and it is based on the first enrollment image that probe images are subsequently compared to determine if there is a match. If there is a match, the user can be authenticated, so as to allow physical access to a place or thing, or logical access from a computer to data. However, these subsequent probe images, whether matching or not (e.g., whether accepted or rejected), can also be stored for the purpose of later—after some time has passed and some number of probe images have been stored—creating additional enrollment images. If an accepted probe image is within the coverage area of the first enrollment image and meets International Organization of Standardization (ISO) iris biometric standards (e.g., ISO 19794 and/or 29794), it can be selected as a subsequent enrollment image. It should be understood that biometric standards are only an example of enrollment criteria that can be used in determining an enrollment image, and other enrollment criteria can be used. It should further be understood that the ISO standards discussed herein are only an example of the biometric standards that can be used in determining an enrollment image, and other biometric standards can be used. It should be understood that the bins 124 of the first enrollment image and the subsequent enrollment image do not need to be adjacent, as long as the subsequent enrollment image falls within a coverage area of at least another enrollment image.

It should be understood that the verification step between the enrollment image and probe image can be only one verification step by the biometric system, and one or more additional verification/authentication steps can be used. For example, the determination of a match between the enrollment image and probe image can be used to indicate that the verification is permissible and one or more additional verification/authentication steps can be used to complete verification of the subject. Similarly, a non-match between the enrollment image and the problem image can be used to indicate that the verification is impermissible and the one or more additional verification/authentication steps should not be used until a match is found with a subsequent probe image.

After the first enrollment image 106 has been stored in the database 112, the camera 104 can be actuated to capture one or more probe images of the subject to authenticate the subject in the biometric identification system. Each probe image is transmitted from the camera 104 to the image analysis module 114 for identification and processing. The image analysis module 114 determines the NITR of the iris in each probe image, and analyzes the probe image relative to the first enrollment image 106 to determine if an authentication match exists. If a match does not exist, the image analysis module 114 can electronically store such probe images as rejected probe images 110 to maintain a record of unsuccessful authentication requests.

If a match does exist, the image analysis module 114 can electronically store the matched probe images as accepted images 108 in the appropriate bin 124 based on the NITR of the iris in the probe images. For example, some accepted images 108 can be saved in the same bin 124 as the first enrollment image 106 if the NITR of the accepted image 108 is in the same NITR range, while other accepted images 108 can be saved in adjacent bins 124 if the accepted images 108 are within the coverage area of the first enrollment image 106 and have an NITR that falls within a different NITR range. For example, if the first enrollment image 106 has an NITR of 43% and is associated with the third bin 124, an accepted image 108 with an NITR of 62% can be saved in the adjacent fourth bin 124.

As the system 100 is used, multiple accepted images 108 can be saved in the fourth bin 124. Based on the highest acceptance matching value (e.g., the highest number of accepted images 108 falling within a specific section or point of the coverage area of the first enrollment image 106), the image analysis module 114 can select and establish one accepted image from the fourth bin 124 as a second enrollment image 106 of the system 100. The second enrollment image 106 also has a coverage area that extends across the majority of the fourth bin 124 and at least a portion of the adjacent bins (e.g., the third and fifth bins 124). The coverage area of the second enrollment image 106 partially overlaps with the coverage area of the first enrollment images 106.

The system 100 can continue to collect accepted probe images 108 for bins 124 having the enrollment images 106, and for bins 124 without enrollment images 106 in order to select at a future time the enrollment images 106 for these bins 124. Existing enrollment images 106 can be updated, replaced or supplemented with accepted probe images 108 that meet an enrollment selection criteria. The enrollment selection criteria includes that the accepted probe image 108 is within the coverage area of at least one existing enrollment image 106, and any other enrollment image criteria (e.g., a highest acceptance matching value, or the like). In some embodiments, any other enrollment image criteria can be in accordance with the ISO iris biometric standards, such as ISO 19794 and/or 29794 (e.g., Information Technology, Biometric Sample Quality, Iris Image Data, or the like). In some embodiments, one bin 124 can include more than one enrollment image 106 such that a single bin 124 provides for enrollment images 106 having different (but overlapping) coverage areas. The system 100 therefore adapts over time to include enrollment images 106 across a wide range of environmental conditions that affect the NITR of the subject. Each enrollment image 106 has a coverage area that overlaps with at least another enrollment image 106 coverage area. The system 100 thereby generates and improves an iris template using a series of images over time to improve the performance of the system 100 under a variety of ambient lighting conditions. In particular, the coverage areas ensure that the subject can be authenticated under different environmental conditions. For example, the multiple coverage areas across various NITR ranges allows for matching of a subject in bright daylight or a pitch black room, and using stationary or mobile devices having the iris authentication system.

By storing additional enrollment images 106 at various dilations, the nearest match can be used as a better starting point for an authentication comparison. Instead of capturing all dilations during a single enrollment session, the accepted probe images 108 can be acquired over time by the system 100 automatically each time a user is authenticated. Additional processing by the image analysis module 114 is used to compare all collected accepted probe images 108 to determine the best image or set of images, thereby converting the best accepted probe image 108 into an enrollment image 106. The automatic/adaptive selection of enrollment images 106 (and their resulting templates) improves the robustness of the system 100 over time. The operation of the system 100 makes authenticating subjects, especially difficult to match subjects, easier. As the system 100 adapts to better templates, subjects can have a higher match rate. Over time, if a subject's iris changes slowly, the system 100 can continue to adapt to match their biometric.

Various embodiments can be implemented to reduce imposter trials and improve the overall speed of the system 100. In some embodiments, only a subset of the enrollment images 106 can be adapted at a time to avoid explosive growth in storage requirements. In some embodiments, templates (e.g., enrollment images 106) can be compressed by exploiting redundant information expected in them. For example, older templates can be replaced with more current templates, thereby reducing imposter trials and improving the speed of the system 100. In some embodiments, different quantities of adapted templates can be used based on the specific subject. For example, subjects that are easy to match can use less templates, while difficult to match subjects can use extra templates to reduce imposter trials. In some embodiments, the enrollment gallery can be limited to enrollment images 106 that include the nearest pupil size available if a plurality of enrollment images 106 exist based on the probe image metrics. For example, if the system 100 includes multiple enrollment images 106 for different pupil dilations of the subject, when a new probe image is matched against the enrollment gallery, the enrollment gallery can be temporarily limited to enrollment images 106 that are closest in dilation to the probe image. Thus, although the full enrollment gallery continues to exist, matching, in this embodiment, is only attempted with only one (or a small amount) of enrollment images 106. In some embodiments, the system 100 can be used for analysis and adaptation of other biometric modalities using substantially similar processes but with different metrics. For example, the system 100 can be used to capture faces and authenticates the subject based on adjustments in landmarks that are muscle-based and less bone-based. As a further example, the system 100 can detect and adjust for distances between minutia when using fingerprints of the subject. Thus, the system 100 can be used to detect and verify/authenticate a subject based on various subject characteristics (e.g., facial characteristics, fingerprints, combinations thereof, or the like).

The system 100 can include a user interface 126 with a graphical user interface (GUI) 128. The GUI 128 can be used by the user to input data into the system 100, and can further be used to output data to the user. For example, the GUI 128 can output whether the authentication or enrollment has been successful, suggest repositioning of the user relative to the camera 104, or the like. In some embodiments, the GUI 128 can output an audio and/or visual alarm if the authentication or enrollment process has been unsuccessful.

Figure 2:
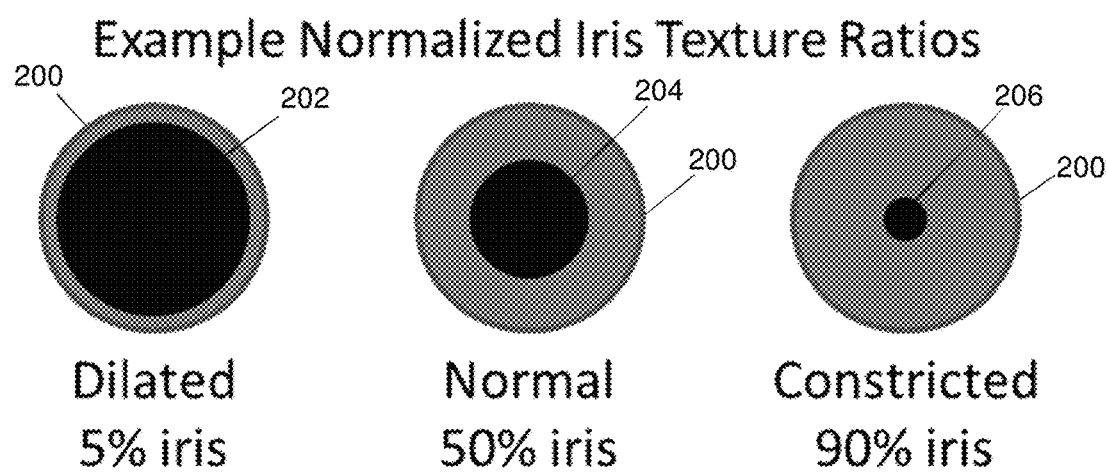
FIG. 2 is a diagrammatic representation of exemplary normalized iris texture ratios showing dilated, normal, and constricted pupils.

FIG. 2 is a diagrammatic representation of exemplary normalized iris texture ratios of a subject. In particular, the leftmost iris 200 has a dilated pupil 202 (e.g., a 5% dilated iris), the central iris 200 has a normal pupil 204 (e.g., 50% dilated iris), and the rightmost iris 200 has a constricted pupil 206 (e.g., a 90% constricted iris). It should be understood that the system 100 includes bins 124 with NITR ranges that include each of the NITRs of FIG. 2.

Figure 3:
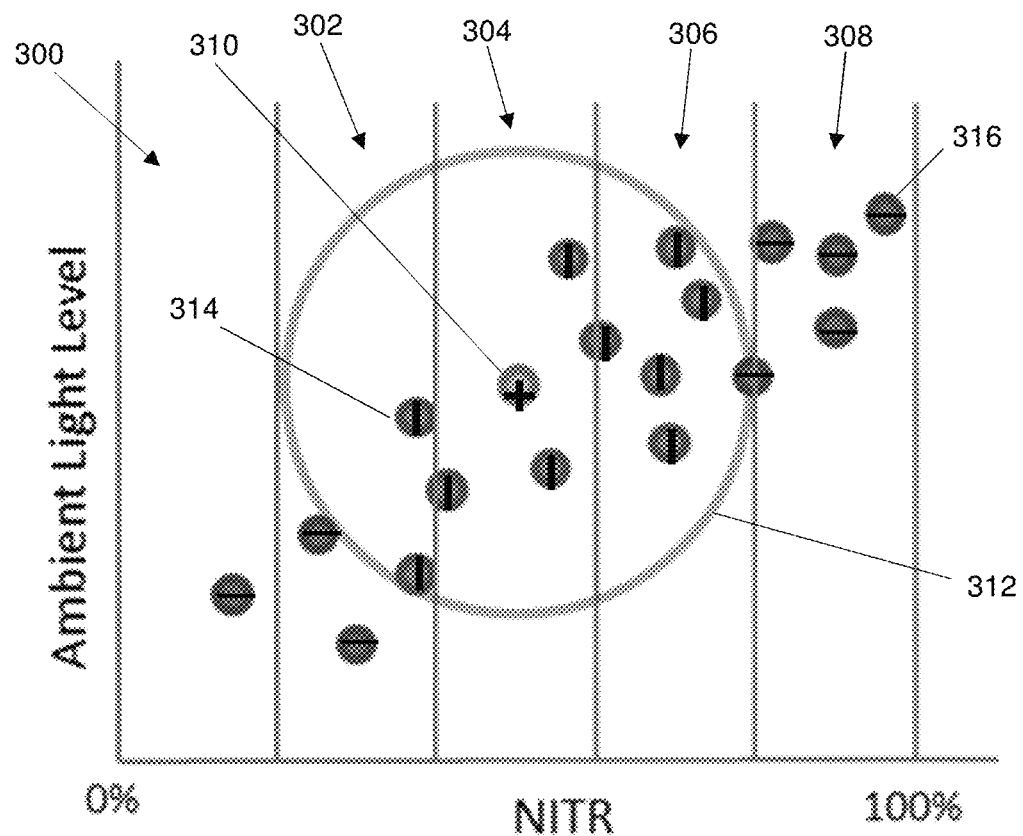
FIG. 3 is a diagrammatic representation of an exemplary enrollment image, accepted probe images stored in five normalized iris texture ratio (NITR) bins, and ignored rejected probe images.

FIG. 3 is a diagrammatic representation of an exemplary enrollment image, accepted and rejected probe images stored in respective bins. The system 100 includes a predetermined number of bins (e.g., bins 300-308) with each bin corresponding to a specific NITR range. The NITR of the iris in each image indicates which bin the image should be stored under (e.g., the position along the x-axis). The ambient or illumination source light level indicates the position of the image along the y-axis. The system 100 attempts to fill each bin 300-308 over time with one or more acceptable enrollment images 310.

The system 100 starts with a single enrollment image 310 (e.g., a first enrollment image) taken under any lighting conditions. The enrollment image 310 has a coverage area 312 defined by a radius surrounding the enrollment image 310. It should be understood that the radius effectively represents variation in pupil dilation from the pupil dilation at the enrollment image 310, with a larger radius representing looser thresholds (e.g., greater pupil dilation variation that can match with the enrollment image 310) and a smaller radius representing tighter thresholds (e.g., smaller pupil dilation variation that can match with the enrollment image 310). The coverage area 312 extends across a portion of the bin 304 in which the enrollment image 310 is stored (e.g., extending only across a predetermined ambient light level range), and further extends over portions of the adjacent bins 302, 306. Probe images taken of the subject are compared to the enrollment image 310 to determine authentication or verification of the subject. If the NITR and light levels of the probe image fall within the coverage area 312, a match is found and the probe image is stored as an accepted image 314 in the appropriate bin. If the NITR and/or light levels of the probe image fall outside of the coverage area 312, a match is not found and the probe image is stored as a rejected image 316. The system 100 can prompt the subject to attempt authentication again if the probe image is rejected. Since enrollment and accepted probe images 310, 314 undergo the same processing to produce templates, an accepted probe image 314 can be converted by the system 100 into an enrollment image at any time. As the subject uses the system 100, the most recently accepted probe images 314 for each bin are stored for analysis.

After saving a sufficient number of accepted probe images 314 in a bin, the collection is analyzed to select an adaptive enrollment image. This can be done by comparing the accepted probe images 314 in the analysis bin to each other and to adjacent bins where enrollment images 310 already exist. In some embodiments, the enrollment selection criteria for converting an accepted probe image 314 into an enrollment image is that the accepted probe image 314 is within the coverage area of at least one existing enrollment image, and any other enrollment image criteria (e.g., ISO 19794 and/or 29794). In some embodiments, the accepted probe image 314 from the analysis bin matching the greatest number of previously accepted images can be converted to an enrollment image 310 for that bin. This has the effect of expanding the range of ambient lighting conditions and NITR ranges that the system 100 can now operate over without requiring additional effort by a subject. The system 100 therefore learns the eyes of the subject over time and improves the ability to recognize the subject in various environmental conditions.

Figure 4:
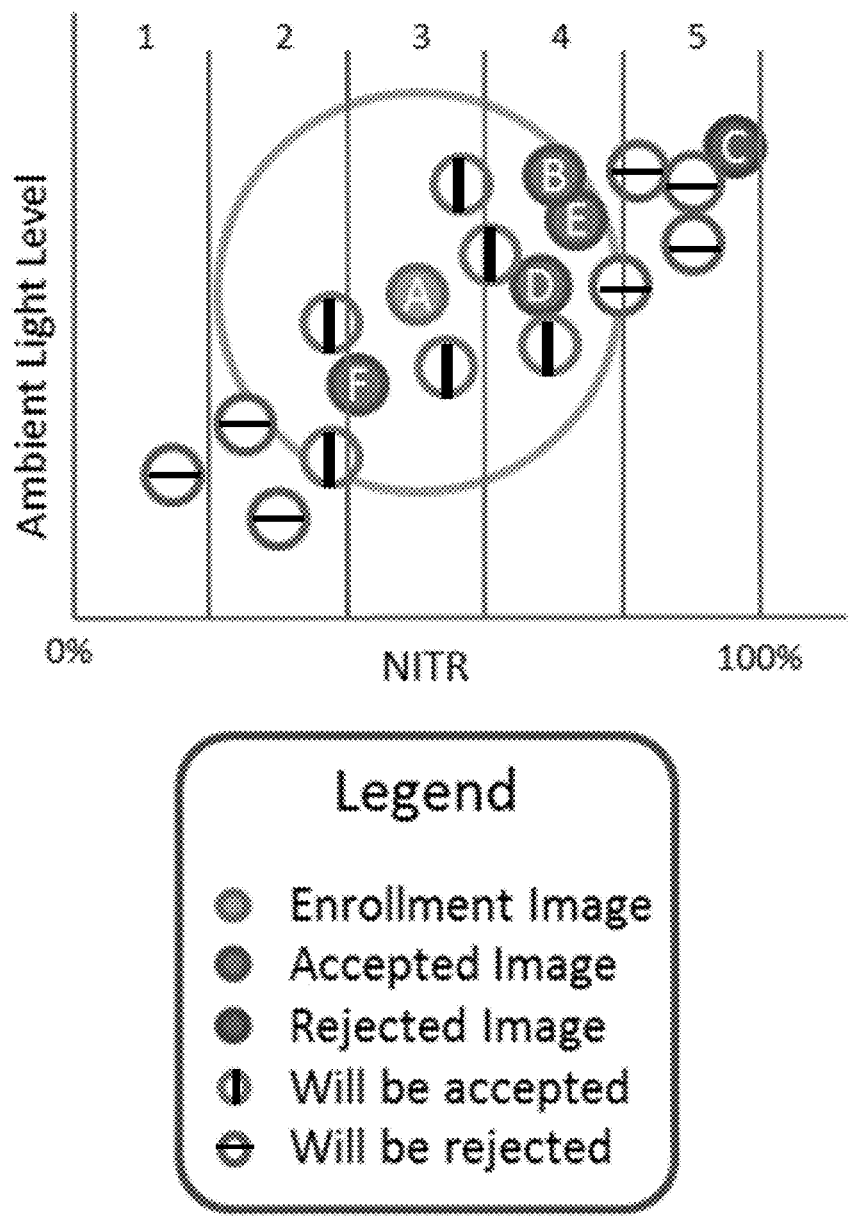
FIG. 4 is a diagrammatic representation of an exemplary first enrollment image and coverage area.
Figure 5:
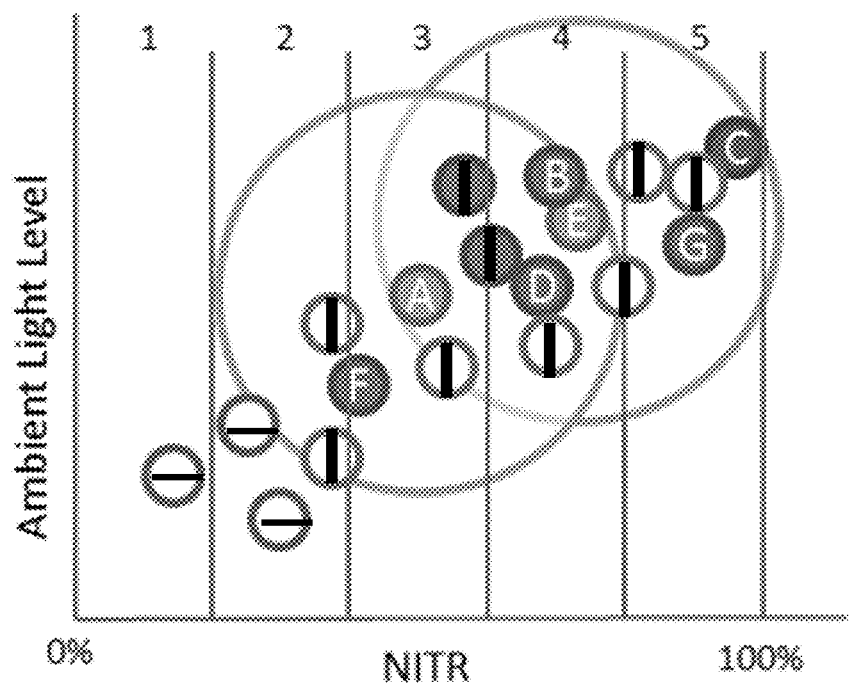
FIG. 5 is a diagrammatic representation of an exemplary improved coverage area after adaptation of the biometric enrollment system.
Figure 6:
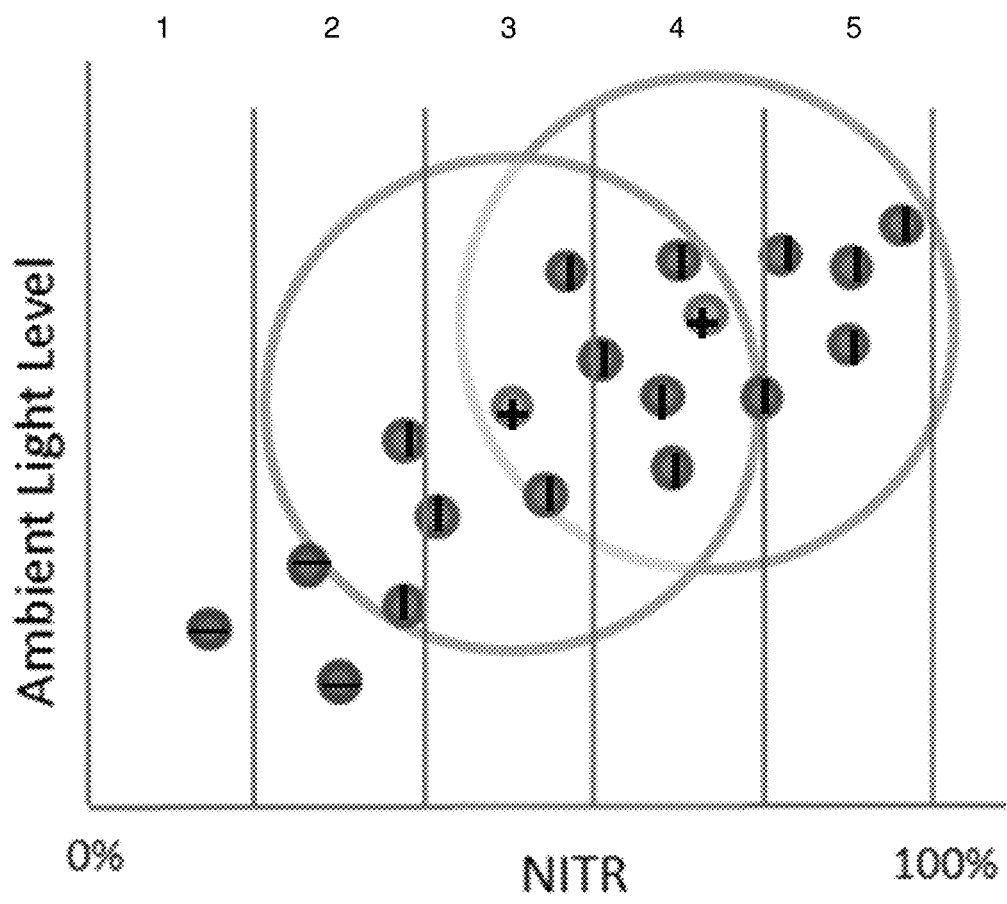
FIG. 6 is a diagrammatic representation of an exemplary expanded operation environmental range after adaptive enrollment processing of accepted probe images.

FIGS. 4-6 show diagrammatic representations of the enrollment process as performed by the system 100. With respect to FIG. 4, the initial iris is enrolled into the system 100 in bin 3 as enrollment image A. Various accepted probe images are stored based on matching within the coverage area of the enrollment image A. Rejected probe images that fall outside of the coverage area of the enrollment image A can also be stored. The accepted probe image B is within the coverage area of the enrollment image A. Since accepted probe image B is stored in a bin without an enrollment image, it can be stored for later analysis and potential conversion into an enrollment image. Although shown as being positioned in a bin adjacent to the bin with the enrollment image A, it should be understood that accepted probe images converted into an enrollment image can be in a bin that is not adjacent to the bin of the enrollment image A (e.g., if the coverage area of the enrollment image A extends over more than one bin). Rejected probe image C is not similar enough to the only enrollment image A of the system 100 (e.g., outside of the coverage area), and therefore is not accepted for authentication.

Accepted probe image D is within the coverage area of the enrollment image A. Since accepted probe image D is stored in a bin within an enrollment image, it is also stored for later analysis and potential conversion into an enrollment image. Accepted probe image E is within the coverage area of the enrollment image A. Since accepted probe image E is stored in a bin within the coverage area of an enrollment image, it is also stored for later analysis and potential conversion into an enrollment image. After a predetermined number of accepted probe images have been saved in bin 4 (a bin without an enrollment image), the accepted images of bin 4 can be analyzed to determine which of the accepted probe images matches the enrollment selection criteria (e.g., the ISO iris biometric standards). As an example, accepted probe image E can be selected as the image matching the enrollment selection criteria and is converted to an enrollment image (as shown in FIG. 5).

The enrollment image E of FIG. 5 also has a coverage area that extends a portion of the light levels in bin 4, and further extends over the adjacent bins 3 and 5. The coverage areas of the enrollment images A, E overlap. Accepted probe image F is within the coverage area of the enrollment image A. Because accepted probe image F has characteristics similar to those within the coverage area A, the system 100 can continue to authenticate subjects based on the characteristics associated with the enrollment image A. Accepted probe image G is an image that would have been rejected by the system 100 if the system 100 only included enrollment image A and had not adaptively expanded the coverage area. However, because the system 100 adaptively expanded the coverage area to include enrollment image E, accepted probe image G can be matched with the enrollment image E and saved in bin 5.

A similar process can be performed as accepted probe images are stored for bins 1, 2 and 5 to establish an enrollment image for such bins, thereby expanding the coverage area across all NITR ranges and light levels. Existing enrollment images A, E can be replaced if accepted probe images having higher acceptance rates are stored over time. FIG. 5 also shows probe images that would be accepted by the system 100 based on the expanded coverage area, as well as probe images that would be rejected by the system 100 due to a lack of enrollment images in bins 1 and 2.

FIG. 6 shows a more compact version of FIG. 5, with two enrollment images (one in bin 3 and one in bin 4), each enrollment image having a coverage area extending over at least a portion of the adjacent bins. FIG. 6 further shows several accepted probe images that fall within only the coverage area of the enrollment image in bin 3, fall within only the coverage area of the enrollment image in bin 4, or fall within the coverage area of both of the enrollment images. The expanded coverage area allows for authentication of the user in a variety of environmental conditions, each type of environmental condition being associated with a particular enrollment image. Over time, the system 100 can continue to adapt by adding enrollment images to bins 1, 2 and 5 based on accepted probe images, thereby expanding the coverage area in which the user can be authenticated.

Figure 7:
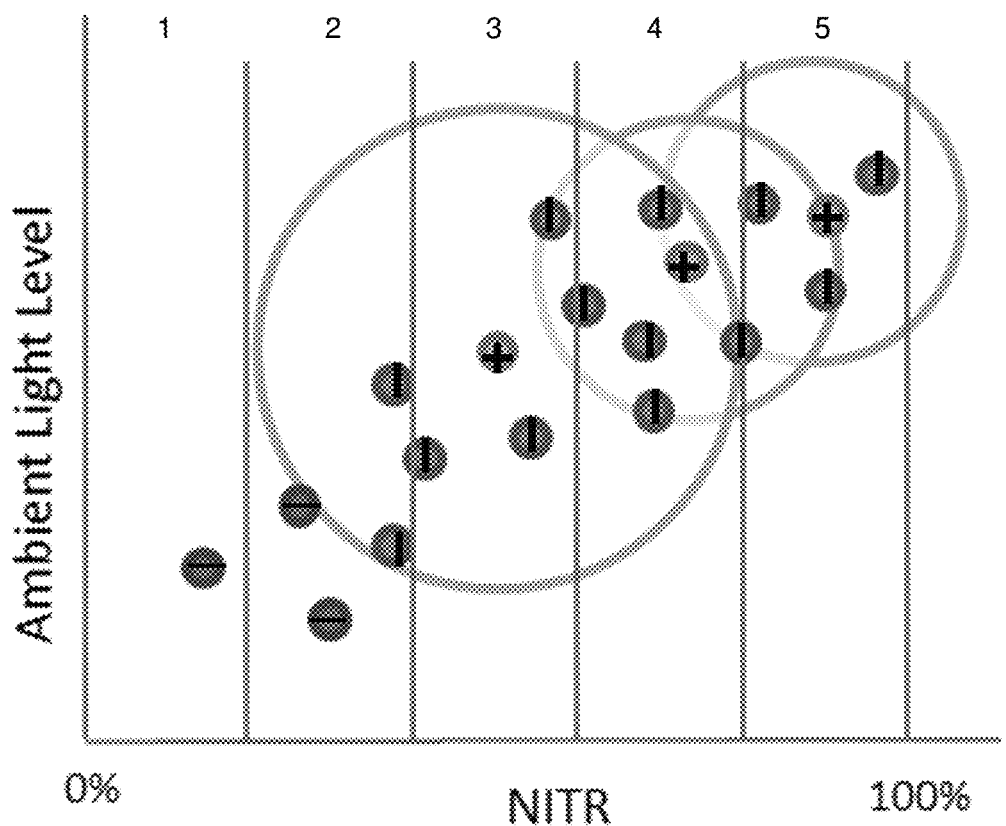
FIG. 7 is a diagrammatic representation of exemplary mixed thresholds for matching enrollment images based on supporting adjacent bins.

FIG. 7 is a diagrammatic representation of three bins having enrollment images, resulting in coverage areas extending from bin 2-5. In some embodiments, adding additional enrollment images into the system can increase the false accept rate. To combat this, the threshold for accepting a match can be reduced once enrollment images in adjacent bins have been established. In particular, the threshold for accepting a match can be limited by the size of the coverage area associated with the enrollment image. For example, the first enrollment image stored in bin 3 can have a higher threshold for accepting a match as indicated by the larger radius of the coverage area. Keeping the thresholds as high as possible initially allows the system 100 enough flexibility to adapt to the broader range of ambient lighting conditions. Subsequent enrollment images (e.g., enrollment images stored in bins 4 and 5), can have a reduced threshold for accepting a match as indicated by the smaller radius of the coverage areas. More closely related characteristics of the iris are therefore needed to match with the coverage area of the enrollment images in bins 4 and 5.

In some embodiments, the higher threshold can be maintained if any adjacent bins to the bin having the enrollment image do not have an enrollment image. For example, while bin 3 has an enrollment image, the adjacent bin 2 does not have an enrollment image. Therefore, the coverage area or threshold for the enrollment image in bin 3 can be high. As a further example, bin 4 has an enrollment image and the adjacent bins 3 and 5 have an enrollment. Therefore, the coverage area or threshold for the enrollment image in bin 4 can be reduced. In some embodiments, the coverage area or threshold for edge bins (e.g., bin 5 representing the edge of the NITR range) can be reduced.

Matching can be restricted to the enrollment image in the NITR bin of the probe image and the enrollment image from the adjacent bin closest to the NITR of the probe image. For example, a probe image falling into bin 5 can be matched against the enrollment image in bin 5 and the enrollment image in the adjacent bin 4. As a further example, assuming the bins in FIG. 7 are each approximately 20%, a probe with an NITR of 85% can be matched against the 80-100% bin (bin 5) enrollment image and the 60-80% bin (bin 4) enrollment image.

In some embodiments, once enrollment images are established in each bin, the system 100 can limit or stop the saving and electing of new enrollment images. In some embodiments, the system 100 can continue the process of replacing enrollment images with new enrollment images selected from more recent accepted probe images, thereby adapting to environment conditions and changes of the subject. For example, the enrollment image for a bin can be voted out in favor of a temporarily better probe image given the most recent operating conditions. In some embodiments, the process can repeat indefinitely to provide for automatic and continuous adaptation of the system 100.

Figure 8:
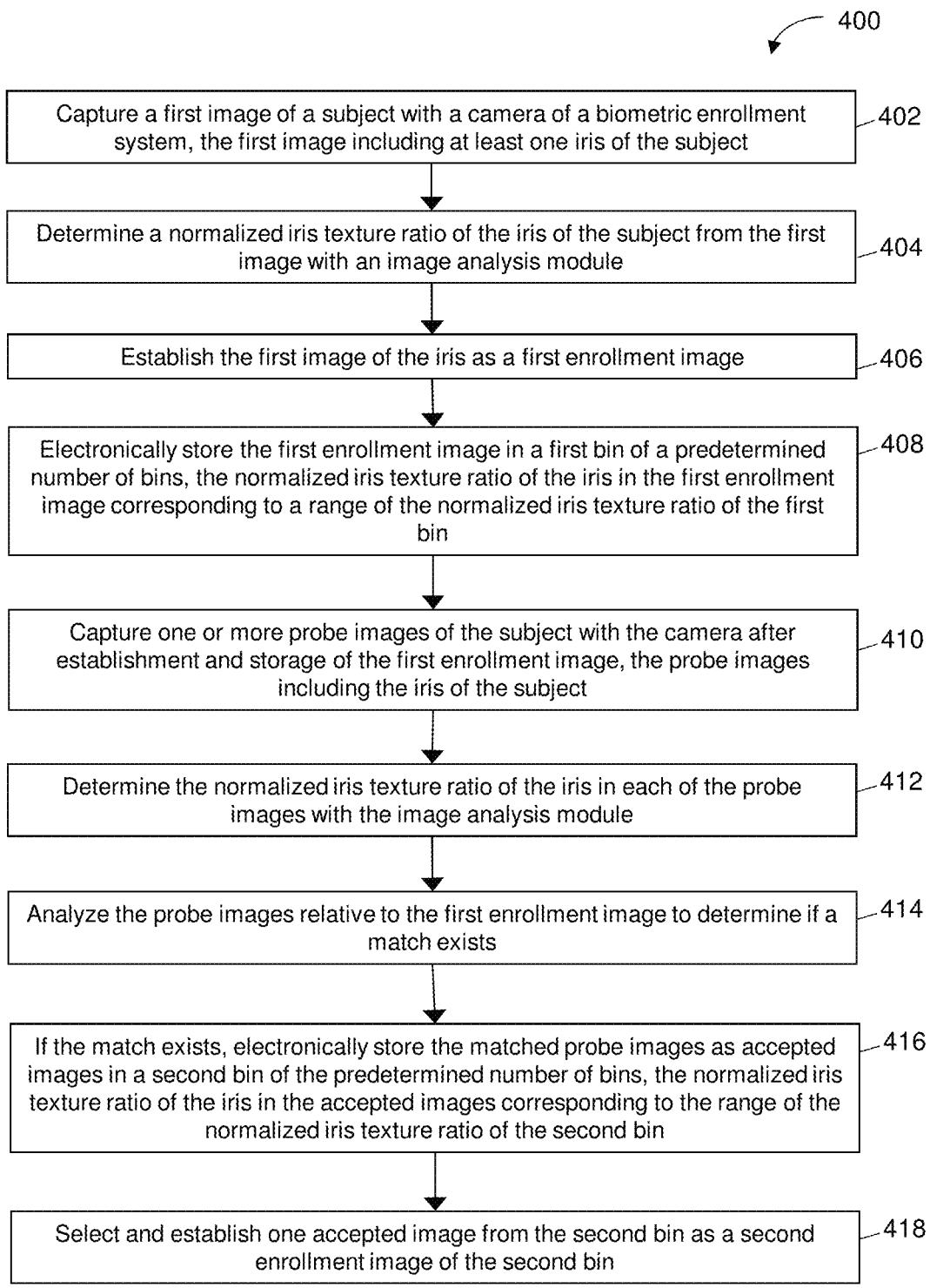
FIG. 8 is a flowchart illustrating an exemplary process of implementing an exemplary biometric enrollment system in accordance with the present disclosure.

FIG. 8 is a flowchart illustrating an exemplary process 400 of implementing the biometric enrollment systems disclosed herein. To begin, at step 402, a first image of a subject is captured with a camera of the biometric enrollment system. The first image includes at least one iris of the subject. At step 404, the NITR of the iris is determined from the first image with the image analysis module. At step 406, the first image is established as a first enrollment image. At step 408, the image analysis module electronically stores the first enrollment image in a bin based on the NITR of the first enrollment image and the bin, as well as the lighting levels.

At step 410, one or more probe images are captured with the camera that include the iris of the subject. At step 412, the NITR of the iris in each probe image is determined with the image analysis module. At step 414, the probe images are analyzed relative to the first enrollment image to determine if a match exists. At step 416, if a match exists, the matched probe image is electronically stored in another bin as an accepted probe image based on the NITR of the bin and the accepted probe image. After a predetermined number of accepted probe images have been saved in the bin not having the first enrollment image, at step 418, one of the accepted probe images is selected and established as an enrollment image for that bin. The process 400 can continue until enrollment images have been established for each of the bins, thereby providing for coverage areas for authentication across a wide range of NITR and light level conditions.

Figure 9:
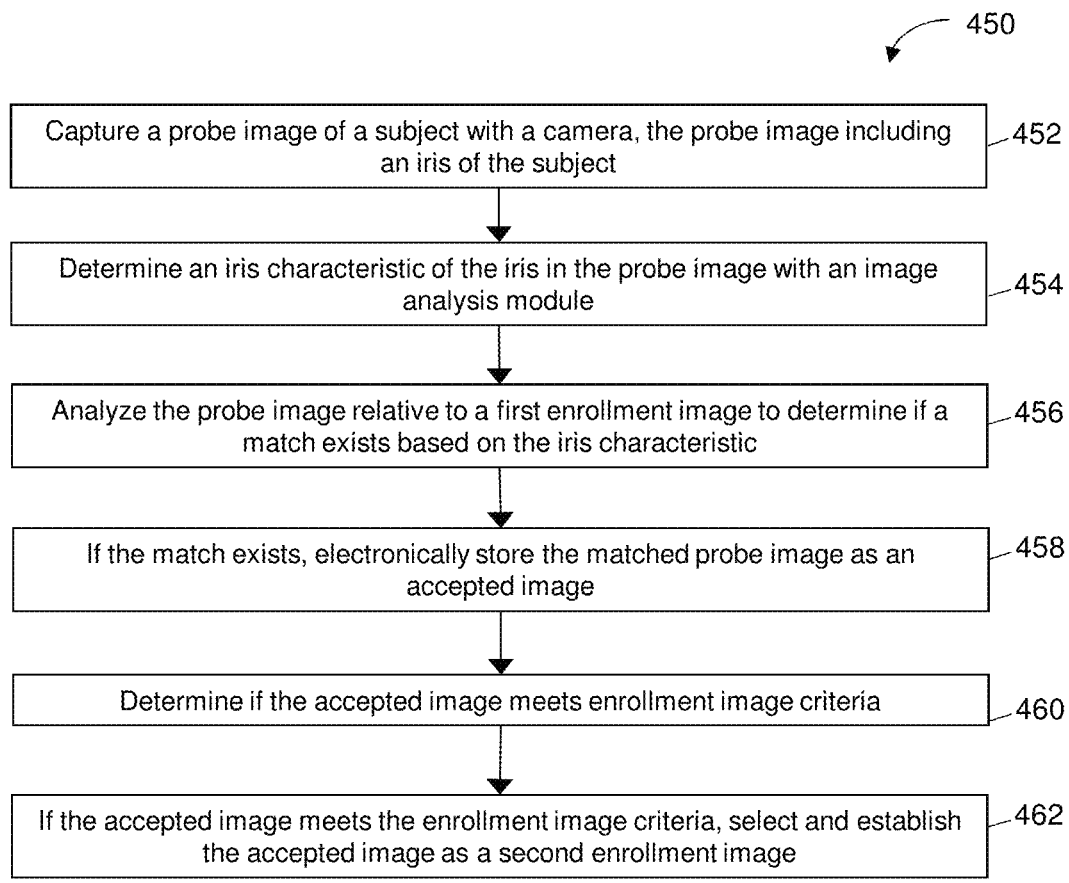
FIG. 9 is a flowchart illustrating an exemplary process of implementing an exemplary biometric enrollment system in accordance with the present disclosure.

FIG. 9 is a flowchart illustrating an exemplary process 450 of implementing the biometric enrollment systems disclosed herein. To begin, at step 452, a probe image of a subject is captured with a camera. The probe image includes an iris of the subject. At step 454, an iris characteristic of the iris in the probe image is determined with an image analysis module. At step 456, the probe image is analyzed relative to a first enrollment image to determine if a match exists based on the iris characteristic. At step 458, if the match exists, the matched probe image is electronically stored as an accepted image. At step 460, a determination is made whether the accepted image meets enrollment image criteria. At step 462, if the accepted image meets the enrollment image criteria, the accepted image is selected and established as a second enrollment image.

Figure 10:
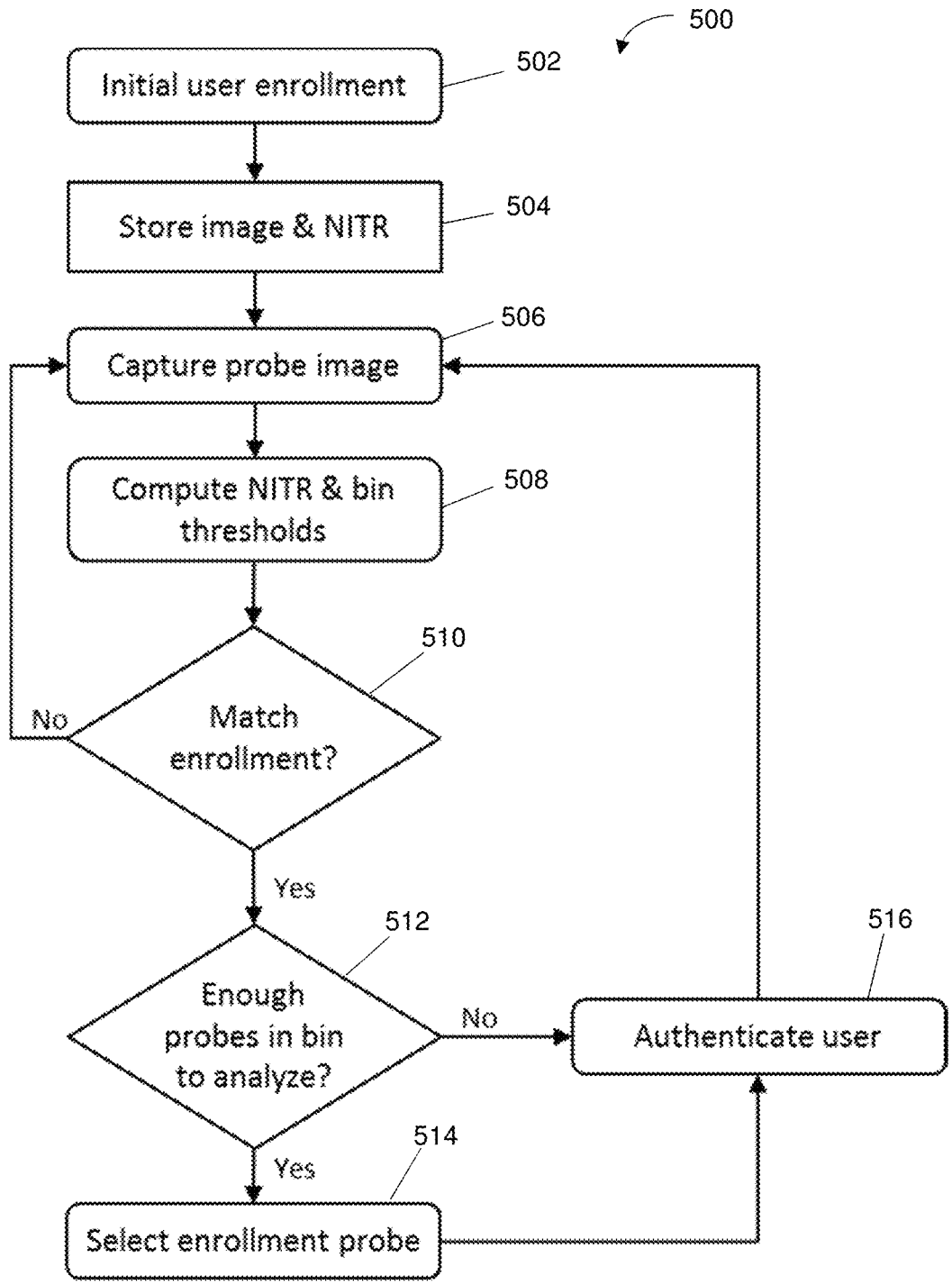
FIG. 10 is a flowchart illustrating an exemplary process of implementing an exemplary biometric enrollment system in accordance with the present disclosure.

FIG. 10 is a flowchart illustrating an exemplary process 500 of implementing the biometric enrollment systems disclosed herein. To begin, at step 502, the initial subject is enrolled with a first enrollment image. At step 504, images and the associated NITR are stored by the system. At step 506, probe images are captured by the camera for authentication of the subject. At step 508, the NITR and bin thresholds are determined by the image analysis module. At step 510, the image analysis module determines whether a match exists between the probe image and the first enrollment image. If a match does not exist, the subject is prompted to return to step 506 for capturing another probe image in an attempt to authenticate the subject.

If a match does exist, at step 512, the accepted probe image can be stored in the appropriate bin and the image analysis module determines if a sufficient number of accepted probe images are stored in the bin to establish an enrollment image. If a sufficient number of accepted probe images exist, at step 514, the image analysis module can select the accepted probe image with the highest matching value as the enrollment image for the bin. If a sufficient number of accepted probe images does not exist, at step 516, the user can be authenticated and the process 500 can continue to gather accepted probe images when probe images are captured at step 506 during subsequent authentication attempts.

Thus, the NITR can be used to group images into bins for analysis. Once a predetermined number of accepted probe images are stored in a single bin not having an enrollment image, the collection of accepted probe images with similar NITRs can be analyzed to adaptively select additional enrollment images or templates. Storing multiple enrollment templates improves matching of the subject over time based on varying environmental conditions and changes in the subject. The NITR can be used to limit which enrollment templates can be used to match a new probe image after additional enrollment templates have been stablished. Coverage areas or thresholds for each enrollment image can also be modified (e.g., reduced) to reduce the likelihood of false authentication of the subject.

In some embodiments, specific iris biometric standards can be applied when capturing images and creating enrollment images. For example, the captured images should be capable of being analyzed for usable iris texture areas which are directly related to the eye opening, occlusions from glasses frames blocking parts of the iris, specular reflections blocking texture, or the like. Preferred images can include contrast at each of the anatomical boundaries to help ensure segmentation is performed accurately and unambiguously. In some embodiments, the pupil-to-iris ratio can be reviewed when accepting probe images, as well as additional criteria, such as overall lighting.

In some embodiments, images that are too dark or too bright can be removed from the collection of images from which enrollment images are selected to reduce changes of false acceptance or matching. In some embodiments, gaze angle can eliminate some images if a subject is not looking directly at the camera (e.g., distracted by another person out of view of the camera). In some embodiments, the systems can give preference to images with the location of the eye closer to the center of the frame, since the lens can have a higher modulation transfer function (MTF) in such areas and generally includes more iris texture information. In some embodiments, the focus of the image can be reviewed to determine if an image can be used (e.g., blurry images can be discarded).

In some embodiments, when starting the matching process, the system may not exhaustively search the database of enrollment images (e.g., an exhaustive search that would attempt to match every enrollment for every subject in the system). Instead, the system can try to match the nearest pupil-to-iris ratio enrollment image for that subject. This helps in reducing the probability of generating a false acceptance. If the nearest size is determined to not be appropriate, the system can analyze the enrollment image having a pupil-to-iris ratio that is less than or equal to a predetermined value, a pupil-to-iris ratio that is greater than or equal to a predetermined value, or a combined weighted approach.

Figure 11:
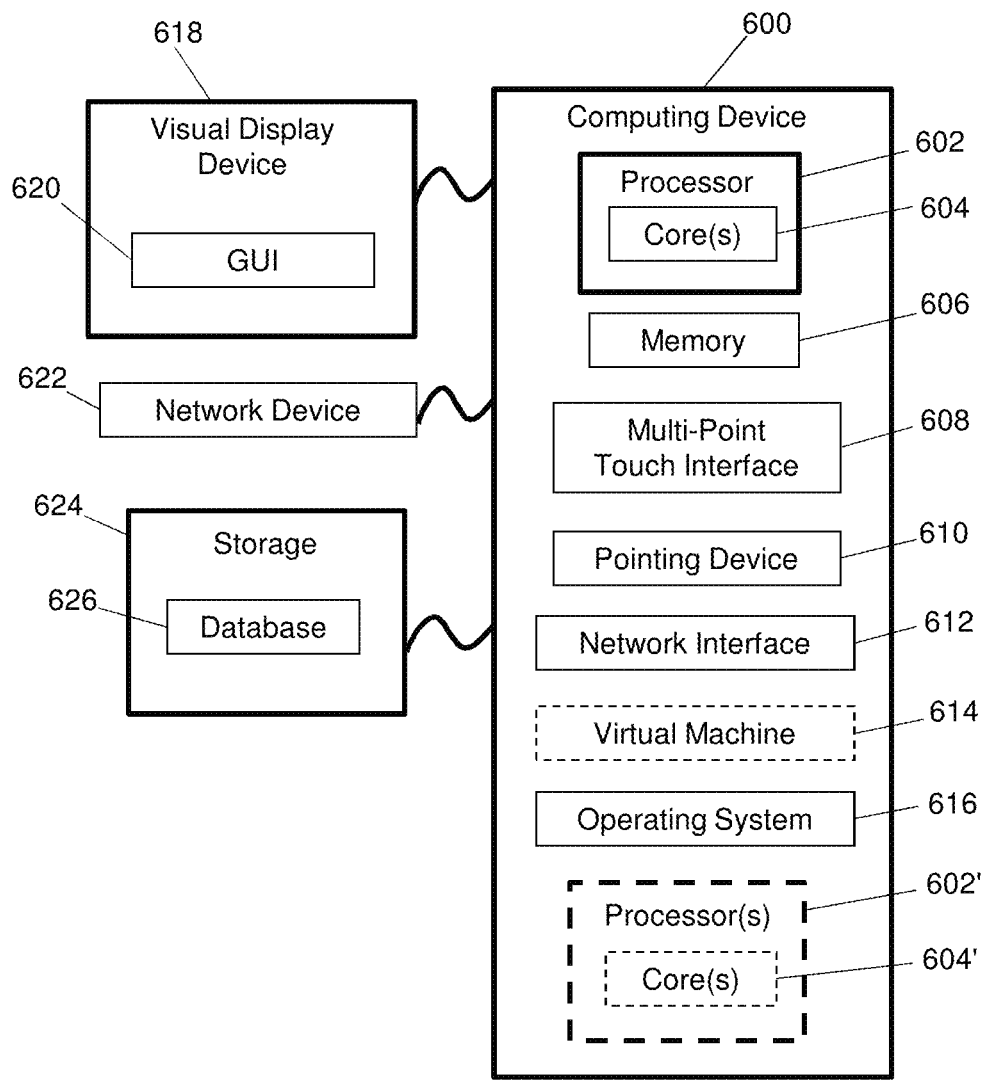
FIG. 11 is a block diagram of an exemplary computing device for implementing an exemplary biometric enrollment system in accordance with the present disclosure.

FIG. 11 is a block diagram of a computing device 600 in accordance with exemplary embodiments of the present disclosure. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 606 included in the computing device 600 may store computer-readable and computer-executable instructions or software for implementing exemplary embodiments of the present disclosure (e.g., instructions for operating the illumination sources, instructions for operating the processing device, instructions for operating the camera, instructions for operating the image analysis module, instructions for operating the communication interface, instructions for operating the user interface, instructions for operating the central computing system, combinations thereof, or the like). The computing device 600 also includes configurable and/or programmable processor 602 and associated core 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' may each be a single core processor or multiple core (604 and 604') processor. Virtualization may be employed in the computing device 600 so that infrastructure and resources in the computing device 600 may be shared dynamically. A virtual machine 614 may be provided to handle a process running on multiple processors so that the process appears to be using only one computing resource rather than multiple computing resources. Multiple virtual machines may also be used with one processor. Memory 606 may include a computer system memory or random access memory, such as DRAM, SRAM, EDO RAM, and the like. Memory 606 may include other types of memory as well, or combinations thereof.

A user may interact with the computing device 600 through a visual display device 618 (e.g., a personal computer, a mobile smart device, or the like), such as a computer monitor, which may display one or more user interfaces 620 (e.g., a graphical user interface) that may be provided in accordance with exemplary embodiments. The computing device 600 may include other I/O devices for receiving input from a user, for example, a camera, a sensor, a keyboard or any suitable multi-point touch interface 608, a pointing device 610 (e.g., a mouse). The keyboard 608 and the pointing device 610 may be coupled to the visual display device 618. The computing device 600 may include other suitable conventional I/O peripherals.

The computing device 600 may also include one or more storage devices 624, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the biometric enrollment systems described herein. Exemplary storage device 624 may also store one or more databases 626 for storing any suitable information required to implement exemplary embodiments. For example, exemplary storage device 624 can store one or more databases 626 for storing information, such as data relating to enrollment images, bins, NITR ranges or values, accepted probe images, rejected probe images, combinations thereof, or the like, and computer-readable instructions and/or software that implement exemplary embodiments described herein. The databases 626 may be updated by manually or automatically at any suitable time to add, delete, and/or update one or more items in the databases.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 may include a built-in network adapter, network interface card, PCMCIA network card, PCI/PCIe network adapter, SD adapter, Bluetooth adapter, card bus network adapter, wireless network adapter, USB network adapter, modem or any other device suitable for interfacing the computing device 600 to any type of network capable of communication and performing the operations described herein. Moreover, the computing device 600 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 600 may run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 616 may be run in native mode or emulated mode. In an exemplary embodiment, the operating system 616 may be run on one or more cloud machine instances.

Figure 12:
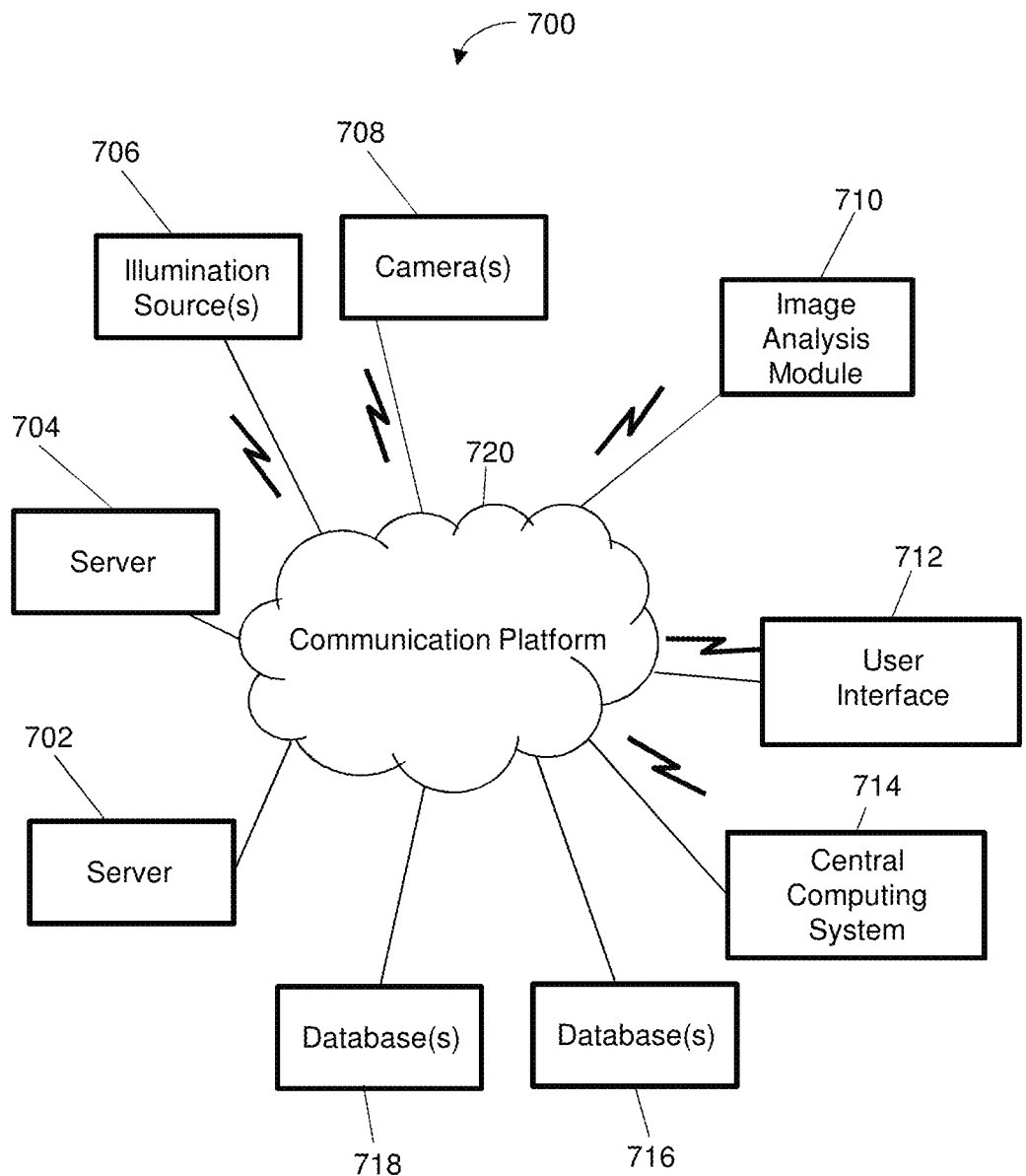
FIG. 12 is a block diagram of an exemplary biometric enrollment system environment in accordance with the present disclosure.

FIG. 12 is a block diagram of an exemplary biometric enrollment system environment 700 in accordance with exemplary embodiments of the present disclosure. The environment 700 can include servers 702, 704 configured to be in communication with one or more illumination sources 706, one or more cameras 708, one or more image analysis modules 710, a user interface 712, and a central computing system 714 via a communication platform 720, which can be any network over which information can be transmitted between devices communicatively coupled to the network. For example, the communication platform 720 can be the Internet, Intranet, virtual private network (VPN), wide area network (WAN), local area network (LAN), and the like. In some embodiments, the communication platform 720 can be part of a cloud environment.

The environment 700 can include repositories or databases 716, 718, which can be in communication with the servers 702, 704, as well as the one or more illumination sources 706, one or more cameras 708, one or more image analysis modules 710, the user interface 712, and the central computing system 714, via the communications platform 720.

In exemplary embodiments, the servers 702, 704, one or more illumination sources 706, one or more cameras 708, one or more image analysis modules 710, the user interface 712, and the central computing system 714 can be implemented as computing devices (e.g., computing device 600). Those skilled in the art will recognize that the databases 716, 718 can be incorporated into one or more of the servers 702, 704. In some embodiments, the databases 716 718 can store data relating to enrollment images, bins, NITR ranges or values, accepted probe images, rejected probe images, combinations thereof, or the like, and such data can be distributed over multiple databases 716, 718.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A biometric enrollment system, comprising:
a camera configured to capture a probe image of a subject, the probe image including an iris of the subject; and
an image analysis module configured to (i) determine an iris characteristic of the iris in the probe image, (ii) analyze the probe image relative to a first enrollment image to determine if a match exists based on the iris characteristic, (iii) if the match exists, electronically store the matched probe image as an accepted image, and (iv) select and establish the accepted image as a second enrollment image if the accepted image meets enrollment image criteria;
wherein the first enrollment image is electronically stored in a first bin of at least first and second bins, the first and second bins corresponding to different ranges of the iris characteristic;
wherein the iris characteristic in the first enrollment image falls within the range of the iris characteristic of the first bin, a coverage area of the iris characteristic of the first enrollment image extending across at least a portion of the first bin and at least across a portion of the second bin;
wherein the accepted image is electronically stored in the second bin, the iris characteristic of the accepted image falling within the range of the iris characteristic of the second bin; and
wherein the accepted image meets the enrollment image criteria if the iris characteristic of the accepted image is within the coverage area of the first enrollment image.

2. The biometric enrollment system of claim 1, wherein the iris characteristic is a normalized iris texture ratio (NITR) of the iris.

3. The biometric enrollment system of claim 1, wherein the coverage area of the first enrollment image defines a variation in the iris characteristic of the iris acceptable for a match with the first enrollment image.

4. The biometric enrollment system of claim 1, wherein the enrollment image criteria includes whether the iris characteristic of the iris in the probe image meets an iris biometric standard.

5. The biometric enrollment system of claim 4, wherein the iris biometric standard is at least one of International Organization of Standardization (ISO) 19794 or ISO 29794.

6. The biometric enrollment system of claim 1, comprising one or more illumination sources configured to illuminate the iris of the subject.

7. The biometric enrollment system of claim 1, wherein the second enrollment image includes a coverage area partially overlapping the coverage area of the first enrollment image.

8. The biometric enrollment system of claim 1, wherein if the match does not exist, the image analysis module is configured to electronically store the probe image as a rejected image in a database.

9. The biometric enrollment system of claim 1, wherein the first enrollment image, the accepted image, and the second enrollment image are electronically stored in a database.

10. The biometric enrollment system of claim 1, wherein the second bin is immediately adjacent to the first bin.

11. The biometric enrollment system of claim 1, wherein the range of the iris characteristic of the first bin is different in size than the range of the iris characteristic of the second bin.

12. The biometric enrollment system of claim 1, wherein the image analysis module is configured to (i) electronically store a second accepted image in a third bin, the third bin corresponding to a different range of the iris characteristic than the first and second bins, the coverage area of the iris characteristic of the first enrollment image extending across at least a portion of the third bin, the iris characteristic of the second accepted image falling within the range of the iris characteristic of the third bin, and (ii) select and establish the second accepted image as a third enrollment image if the accepted image meets the enrollment image criteria, the second accepted image meeting the enrollment image criteria if the iris characteristic of the second accepted image is within the coverage area of at least one of the first enrollment image and the second enrollment image, wherein the coverage area of the iris characteristic of the third enrollment image extends across at least a portion of the first bin and at least across a portion of the third bin.

13. The biometric enrollment system of claim 1, wherein the coverage area of the iris characteristic of the first enrollment image is greater in size than the coverage area of the iris characteristic of the second enrollment image, the greater coverage area of the first enrollment image corresponding with a high threshold for accepting a match with a subsequent probe image having the iris characteristic falling within the coverage area of the first enrollment image, and the reduced coverage area of the second enrollment image corresponding with a lower threshold for accepting a match with a subsequent probe image having the iris characteristic falling within the coverage area of the second enrollment image.

14. The biometric enrollment system of claim 1, wherein if a third bin adjacently disposed to the second bin includes a third enrollment image, the coverage area of the iris characteristic of the second enrollment image is established smaller in size than the coverage area of the iris characteristic of the first enrollment image.

15. The biometric enrollment system of claim 1, wherein the image analysis module is configured to reduce the coverage area of the first enrollment image after selection and establishment of the accepted image as the second enrollment image, the reduced coverage area of the first enrollment image at least partially overlapping the coverage area of the second enrollment image.

16. A method of biometric system enrollment, comprising:
capturing a probe image of a subject with a camera, the probe image including an iris of the subject;
determining an iris characteristic of the iris in the probe image with an image analysis module;
analyzing the probe image relative to a first enrollment image to determine if a match exists based on the iris characteristic, the first enrollment image is electronically stored in a first bin of at least first and second bins, the first and second bins corresponding to different ranges of the iris characteristic, the iris characteristic in the first enrollment image falling within the range of the iris characteristic of the first bin, a coverage area of the iris characteristic of the first enrollment image extending across at least a portion of the first bin and at least across a portion of the second bin;
if the match exists, electronically storing the matched probe image as an accepted image, the accepted image is electronically stored in the second bin, the iris characteristic of the accepted image falling within the range of the iris characteristic of the second bin;
determining if the accepted image meets enrollment image criteria, the accepted image meeting the enrollment image criteria if the iris characteristic of the accepted image is within the coverage area of the first enrollment image; and
if the accepted image meets the enrollment image criteria, selecting and establishing the accepted image as a second enrollment image.

17. The method of claim 16, comprising illuminating the iris of the subject with one or more illumination sources.

18. The method of claim 16, wherein the coverage area of the first enrollment image defines a variation in the iris characteristic of the iris acceptable for a match with the first enrollment image.

19. The method of claim 16, wherein determining if the accepted image meets the enrollment image criteria comprises determining whether the iris characteristic of the iris in the probe image meets an iris biometric standard.

20. The method of claim 19, wherein the iris biometric standard is at least one of International Organization of Standardization (ISO) 19794 or ISO 29794.

21. The method of claim 16, wherein if the match does not exist, the method comprises electronically storing the probe image as a rejected image in a database.

22. The method of claim 16, comprising electronically storing the first enrollment image, the accepted image, and the second enrollment image in a database.

23. A non-transitory computer-readable medium storing instructions for biometric system enrollment that are executable by a processing device, wherein execution of the instructions by the processing device causes the processing device to:
capture a probe image of a subject with a camera, the probe image including an iris of the subject;
determine an iris characteristic of the iris in the probe image with an image analysis module;
analyze the probe image relative to a first enrollment image to determine if a match exists based on the iris characteristic, the first enrollment image is electronically stored in a first bin of at least first and second bins, the first and second bins corresponding to different ranges of the iris characteristic, the iris characteristic in the first enrollment image falling within the range of the iris characteristic of the first bin, a coverage area of the iris characteristic of the first enrollment image extending across at least a portion of the first bin and at least across a portion of the second bin;
if the match exists, electronically store the matched probe image as an accepted image, the accepted image is electronically stored in the second bin, the iris characteristic of the accepted image falling within the range of the iris characteristic of the second bin;
determine if the accepted image meets enrollment image criteria, the accepted image meeting the enrollment image criteria if the iris characteristic of the accepted image is within the coverage area of the first enrollment image; and
if the accepted image meets the enrollment image criteria, select and establish the accepted image as a second enrollment image.

24. A biometric enrollment system, comprising:
a camera configured to capture a probe image of a subject; and
an image analysis module configured to (i) determine a subject characteristic of the subject in the probe image, (ii) analyze the probe image relative to a first enrollment image to determine if a match exists based on the subject characteristic, (iii) if the match exists, electronically store the matched probe image as an accepted image, and (iv) select and establish the accepted image as a second enrollment image if the accepted image meets enrollment image criteria;
wherein the first enrollment image is electronically stored in a first bin of at least first and second bins, the first and second bins corresponding to different ranges of the subject characteristic;

wherein the subject characteristic in the first enrollment image falls within the range of the subject characteristic of the first bin, a coverage area of the subject characteristic of the first enrollment image extending across at least a portion of the first bin and at least across a portion of the second bin;

wherein the accepted image is electronically stored in the second bin, the subject characteristic of the accepted image falling within the range of the subject characteristic of the second bin; and wherein the accepted image meets the enrollment image criteria if the subject characteristic of the accepted image is within the coverage area of the first enrollment image.

25. The biometric enrollment system of claim 24, wherein the subject characteristic is a normalized iris texture ratio (NITR) of an iris of the subject.

26. The biometric enrollment system of claim 24, wherein the coverage area of the first enrollment image defines a variation in the subject characteristic acceptable for a match with the first enrollment image.

27. The biometric enrollment system of claim 24, wherein the enrollment image criteria includes whether the subject characteristic in the probe image meets a biometric standard.

28. The biometric enrollment system of claim 27, wherein the biometric standard is at least one of International Organization of Standardization (ISO) 19794 or ISO 29794.

29. The biometric enrollment system of claim 24, wherein the subject characteristic is a facial characteristic of the subject.

30. The biometric enrollment system of claim 29, wherein the facial characteristic of the subject is at least one of a muscle landmark or a bone landmark of the subject.

* * * * *

UNITED STATES PATENT AND TRADEMARK OFFICE
CERTIFICATE OF CORRECTION

PATENT NO. : 10,366,296 B2  
APPLICATION NO. : 15/475425  
DATED : July 30, 2019  
INVENTOR(S) : Barry E. Mapen et al.

Page 1 of 1

It is certified that error appears in the above-identified patent and that said Letters Patent is hereby corrected as shown below:

In the Specification

In Column 16, Line 64, the word "bin" should be deleted and replaced with the word "bins"; and In Column 18, Line 60, the word "stablished" should be deleted and replaced with the word "established".

Signed and Sealed this  
Twelfth Day of November, 2019

Andrei Iancu  
*Director of the United States Patent and Trademark Office*